US007746380B2

(12) United States Patent
Maruya et al.

(10) Patent No.: US 7,746,380 B2
(45) Date of Patent: Jun. 29, 2010

(54) VIDEO SURVEILLANCE SYSTEM, SURVEILLANCE VIDEO COMPOSITION APPARATUS, AND VIDEO SURVEILLANCE SERVER

(75) Inventors: Kensuke Maruya, Kawasaki (JP); Susumu Okada, Yokohama (JP)

(73) Assignee: Panasonic Corporation, Osaka (JP)

( * ) Notice: Subject to any disclaimer, the term of this patent is extended or adjusted under 35 U.S.C. 154(b) by 1085 days.

(21) Appl. No.: 10/867,952

(22) Filed: Jun. 15, 2004

(65) Prior Publication Data

US 2004/0257444 A1    Dec. 23, 2004

(30) Foreign Application Priority Data

Jun. 18, 2003    (JP)    .............................. 2003-173174

(51) Int. Cl.
    *H04N 5/225*    (2006.01)
(52) U.S. Cl. ...................................................... 348/169
(58) Field of Classification Search ........................ None
    See application file for complete search history.

(56) References Cited

U.S. PATENT DOCUMENTS

| | | | | |
|---|---|---|---|---|
| 5,243,418 A | * | 9/1993 | Kuno et al. | 348/155 |
| 5,413,345 A | * | 5/1995 | Nauck | 473/156 |
| 5,625,410 A | * | 4/1997 | Washino et al. | 348/154 |
| 5,822,542 A | * | 10/1998 | Smith et al. | 709/247 |
| 6,809,760 B1 | * | 10/2004 | Takagi et al. | 348/211.9 |
| 6,816,186 B2 | * | 11/2004 | Luke et al. | 348/159 |
| 6,919,892 B1 | * | 7/2005 | Cheiky et al. | 345/473 |
| 2003/0202102 A1 | * | 10/2003 | Shiota et al. | 348/159 |
| 2004/0239763 A1 | * | 12/2004 | Notea et al. | 348/169 |

FOREIGN PATENT DOCUMENTS

| | | | |
|---|---|---|---|
| JP | 09-289607 | * | 4/1997 |
| JP | 9-289607 | | 11/1997 |
| JP | 2002-92751 | | 3/2002 |
| JP | 2002-092751 | * | 3/2002 |

* cited by examiner

*Primary Examiner*—Nhon T Diep
(74) *Attorney, Agent, or Firm*—Pearne & Gordon LLP

(57) ABSTRACT

The present invention provides a video surveillance system which tracks a tracking target by a plurality of surveillance cameras. This system is capable of tracking completely the location of the tracking target even in case the camera picture is automatically changed in accordance with the moving of the tracking target. The system includes a moving direction detector for detecting the moving direction of a tracking target. Moreover, the system has storage units for storing the passage configuration of a surveillance zone and the camera location information. The system also has a camera selector for identifying a camera which will shoot the tracking target next in accordance with the moving direction information, passage configuration information and camera location information, and a screen composition unit for synthesizing on a screen a picture from a camera shooting the tracking target and a picture from a camera selected by the camera selector.

9 Claims, 27 Drawing Sheets

| PASSAGE DIRECTION - ABSOLUTE MOVING ANGLE | ≤ 90°
→ FORWARD MOVING

| PASSAGE DIRECTION - ABSOLUTE MOVING ANGLE | > 90°
→ BACKWARD MOVING (STRAIGHT PASSAGE: SCREEN ARRANGEMENT ANGLE = 180°)

(STRAIGHT PASSAGE: SCREEN ARRANGEMENT ANGLE = 90°)

(STRAIGHT PASSAGE: SCREEN ARRANGEMENT ANGLE = 135°, 225°)

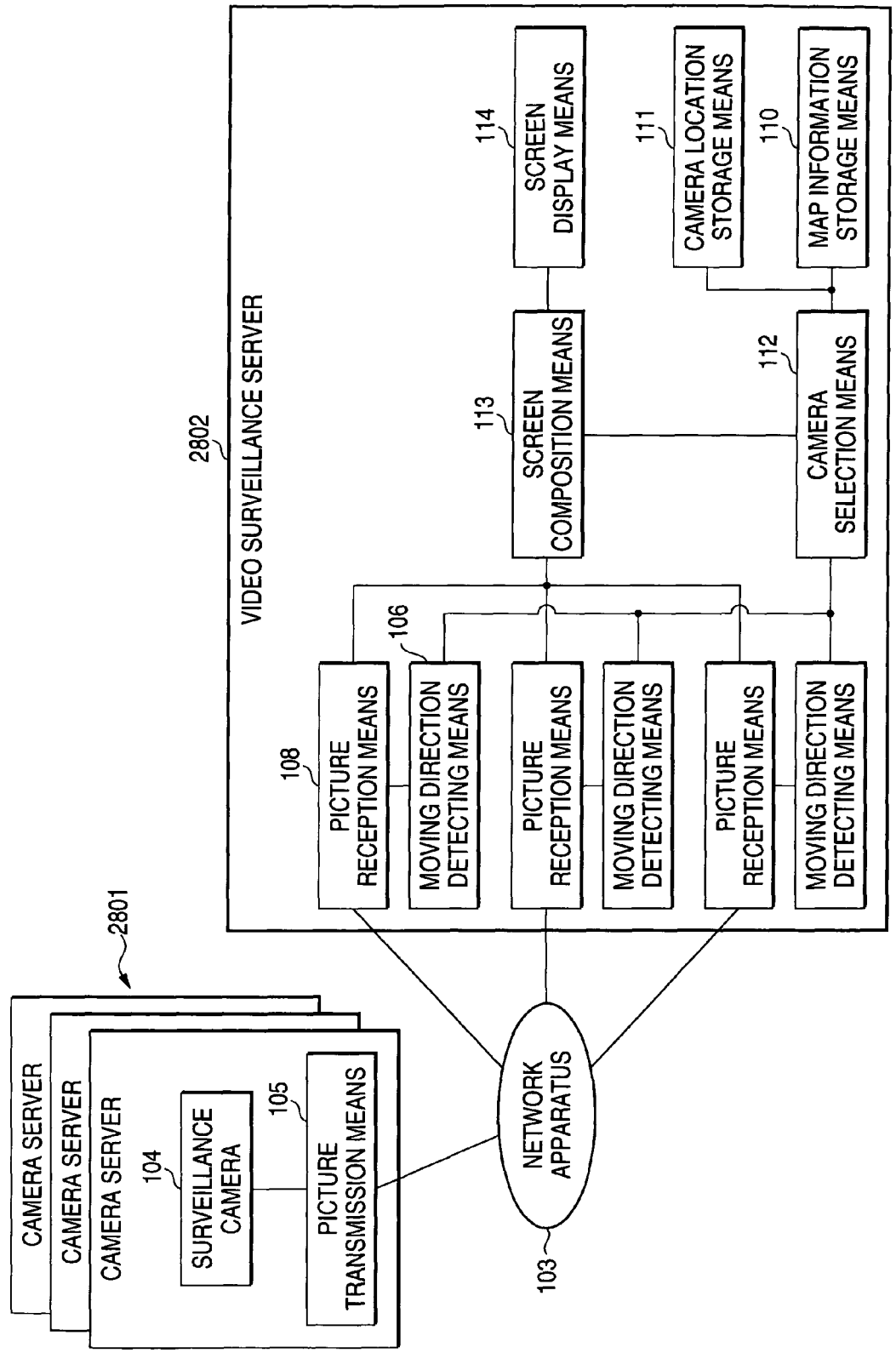

VIDEO SURVEILLANCE SYSTEM, SURVEILLANCE VIDEO COMPOSITION APPARATUS, AND VIDEO SURVEILLANCE SERVER

BACKGROUND OF THE INVENTION

1. Field of the Invention

The present invention relates to a video surveillance system comprising a plurality of surveillance cameras and a surveillance terminal which browses pictures from the surveillance cameras, the video surveillance system automatically displaying the pictures from the plurality of cameras in accordance with the direction of moving of a tracking target and the camera installation state so that the surveyor will keep track of the tracking target.

2. Description of the Related Art

In recent years, in line with the support for IP networks by surveillance apparatus, development of a wide area surveillance system has been under way where a plurality of surveillance cameras are used to monitor a wide area as a single block. Such a surveillance camera reduces the workload of a surveyor in controlling a plurality of cameras by way of automatization of camera control and improvement of the interfaces of a surveillance terminal.

Concerning the automatization of camera control, there is known surveillance apparatus described in the Japanese Patent Laid-Open No. 2002-92751. According to the surveillance apparatus described in the Japanese Patent Laid-Open No. 2002-92751, it is possible to hand over surveillance to other surveillance cameras. This makes it possible to display a tracking target on a surveillance terminal without the operation of the user.

Concerning the interfaces of the surveillance terminal, the Japanese Patent Laid-Open No. 289607/1997 is disclosed. The surveillance system described in the Japanese Patent Laid-Open No. 289607/1997 displays a map which shows the camera locations on the surveillance terminal for the surveyor to readily locate the camera locations.

According to the system equipped with the related art automatic tracking feature, in case the tracking target has moved outside the horizon of the camera performing surveillance, pictures on the surveillance terminal are automatically switched. Thus, it is difficult to readily understand the locations of newly displayed cameras with respect to those of the cameras displayed just before. Even when a map is displayed just like in the system described in the Japanese Patent Laid-Open No. 289607/1997, the surveyor cannot readily understand the relationship between displayed picture and the camera icons on the map. Moreover, it is necessary to frequently move the line of sight between the map and the camera picture in order to check correspondence between the map contents and the camera locations. This increases the workload of the surveyor.

SUMMARY OF THE INVENTION

In order to solve the problems, the invention previously stores the map information on a surveillance zone, information on the camera locations and imaging range information, detects the moving direction of a tracking target based on a picture including the tracking target from one camera, selects at least one other camera which should shoot the tracking target next, and generates a display picture including a picture from the one camera and a picture from the at least one other camera, so as to monitor a moving object as the tracking target by using a plurality of cameras in the surveillance zone. This prevents the surveyor from losing track of the tracking target.

Further, the invention arranges the pictures from the one camera and at least one other camera at locations which can be approximated to the camera locations on the map to generate a display picture. In other words, the invention arranges a next camera picture of the tracking target in the direction the tracking target moves within the sight of the surveyor on the picture screen. Even in case the tracking target has moved and the picture of the shooting camera has changed, it is possible to smoothly guide the line of sight of the surveyor to next camera picture, thereby reducing the workload of the surveyor.

Further, it is possible to display a picture from at least one other camera in the magnitude of the ratio of the distance between the center of imaging of the one camera and the center of the at least one other camera to the magnitude of the picture from the one camera. It is also possible to display the picture from at least one other camera in a location corresponding to the distance. This allows intuitive understanding of camera locations especially in terms of distance, thereby reducing the workload of the surveyor.

Further, by arranging and displaying in chronological order a picture from a camera currently shooting the tracking target, a picture from a camera which used to shoot the tracking target, and a picture from a camera expected to shoot the tracking target, it is possible to readily understand the moving path of the tracking target.

BRIEF DESCRIPTION OF THE DRAWINGS

FIG. 16A shows a 2-screen layout, FIG. 16B shows a 3-screen layout, and FIG. 16C shows a 4-screen layout;

FIG. 28 is a block diagram of a video surveillance system according to the second embodiment of the invention.

Figure 1:
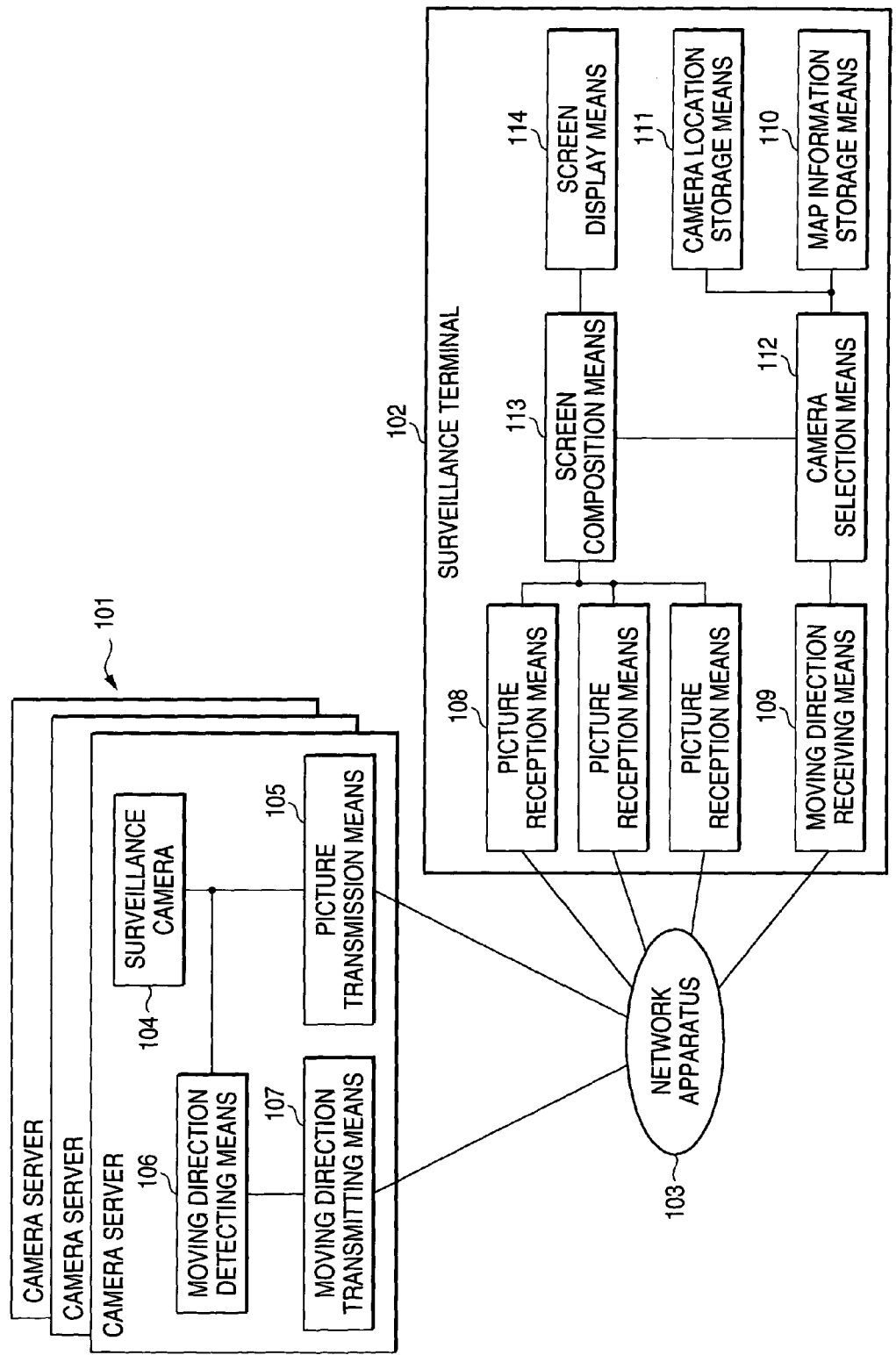
FIG. 1 is a block diagram of a video surveillance system according to the first embodiment of the invention.

In the drawings, a reference numeral 101 refers to a camera server; 102 to a surveillance terminal; 103 to a network apparatus; 104 to a surveillance camera; 105 to picture transmission means; 106 to moving direction detecting means; 107 to moving direction transmitting means; 108 to picture reception means; 109 to a moving direction receiving means; 110 to map information storage means; 111 to camera location storage means; 112 to camera selection means; 113 to a screen composition means; 114 to a screen display means; 301 to a picture at time t; 302 to a picture at time t+δ; 303 to an optical flow picture; 304 to an average vector picture; 401 to a camera ID; 402 to a motion vector; 601 to a passage list; 701 to camera location information; 2001 to screen layout generation means; 2801 to a camera server; and 2802 to a surveillance terminal.

DETAILED DESCRIPTION OF THE PREFERRED EMBODIMENTS

Embodiments of the invention will be described referring to the drawings.

Embodiment 1

A video surveillance system according to the first embodiment of the invention is described below referring to FIGS. 1 through 20.

FIG. 1 is a block diagram showing the configuration of the first embodiment of the invention.

In FIG. 1, a numeral 101 represents a camera server for transmitting to a network the picture data acquired from surveillance cameras and the data on the moving direction of a person in the camera picture, 102 a surveillance terminal for displaying a picture received from the camera server 101 on its screen, 103 network apparatus for connecting a plurality of camera servers and the surveillance terminal, 104 a surveillance camera for shooting pictures, 105 picture transmission means for transmitting picture data acquired from the surveillance camera, 106 moving direction detecting means for analyzing the picture data acquired from the surveillance camera and detecting the moving direction of a person in the picture, 107 moving direction transmitting means for transmitting the moving direction information acquired by the moving direction detecting means to the surveillance terminal via the network apparatus, 108 picture reception means for receiving the picture data transmitted from the camera server, 109 moving direction receiving means for receiving the moving direction information transmitted from the camera server via the network apparatus, 110 map information storage means for storing the passage configuration of a surveillance zone, 111 camera location storage means for storing the location and setting angle of a surveillance camera, 112 camera selection means for identifying a camera shooting the person as a tracking target and a camera which will shoot the person next, 113 screen composition means for synthesizing a plurality of camera pictures on a single screen, and 114 screen display means for displaying the synthesized screen data.

The surveillance camera 104 converts the picture taken to single-frame digital picture data and outputs the data to the picture transmission means 105 and the moving direction detecting means 106.

The picture transmission means 105, on receiving a picture transmission start request from the picture reception means on the surveillance terminal 102, stores the network address of the surveillance terminal 102. When picture data is input, the picture transmission means 105 converts the input picture data to smaller volume of data, such as data in JPEG format, and transmits the resulting data to the surveillance terminal 102 where the network address is stored via the network apparatus. The picture transmission means 105, on receiving a picture transmission stop request from the surveillance terminal, erases the stored network address and no longer transmits a picture even in case picture data is input.

Operation of the moving direction detecting means will be described referring to FIGS. 2 and 3.

Figure 2:
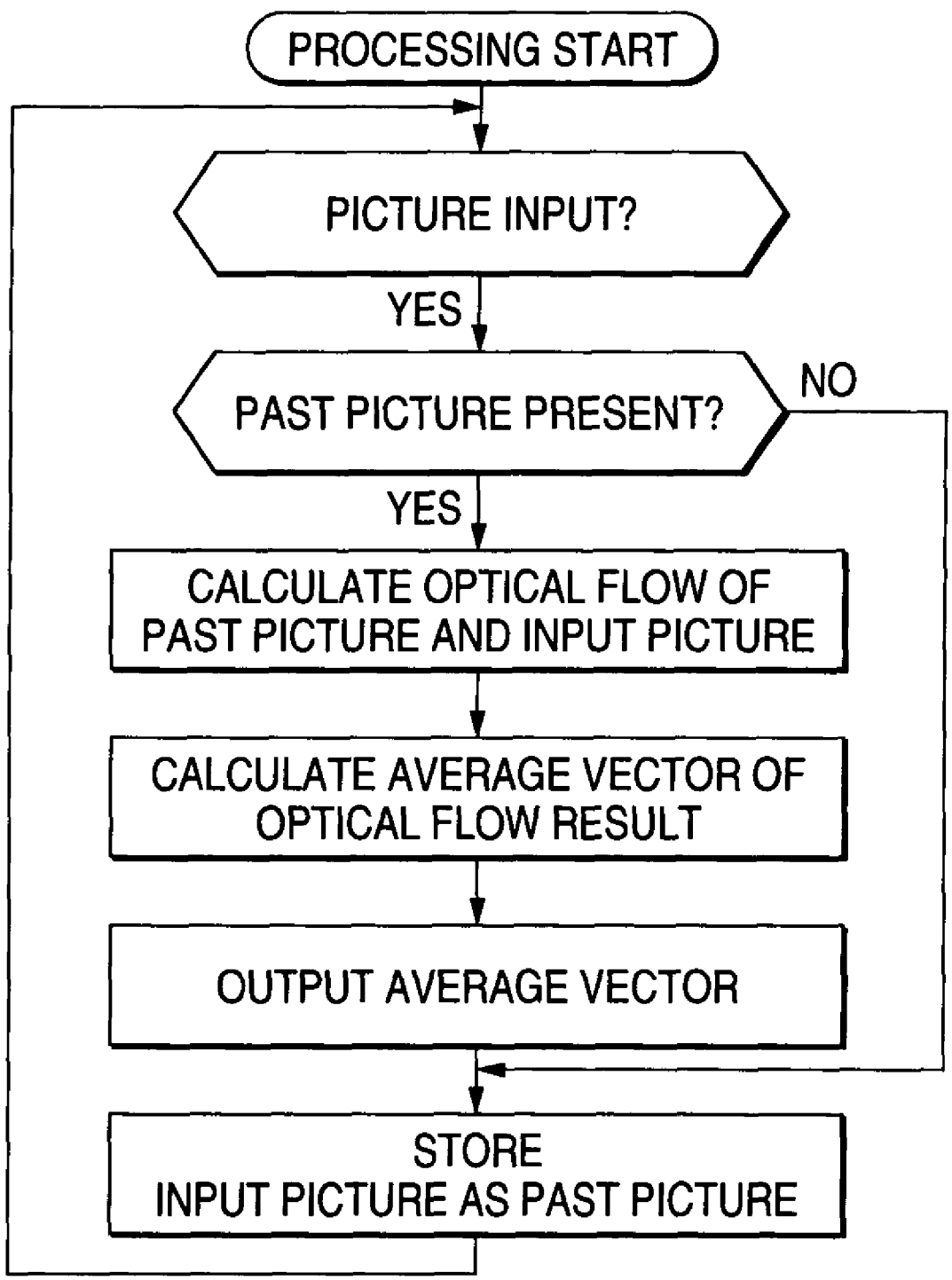
FIG. 2 shows the operation flow of the moving direction detecting means 106 shown in FIG. 1.

FIG. 2 shows the operation flow of the moving direction detecting means.

Figure 3:
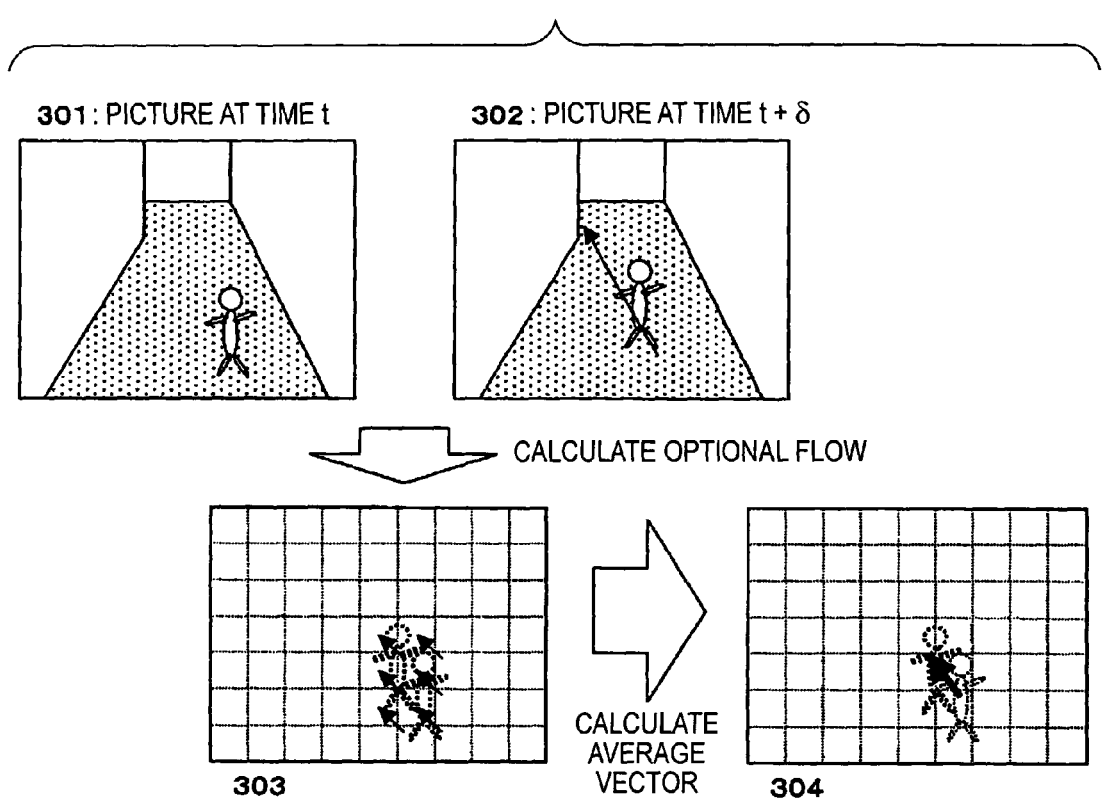
FIG. 3 an example of operation of the moving direction detecting means 106 shown in FIG. 1.

FIG. 3 shows an example of operation of the moving direction detecting means.

In FIG. 3, a numeral 301 represents picture data input the time t, 302 picture data input at time t+, 303 the result of calculation of an optical flow based on the picture at time t and the picture at time t+δ, and 304 the result of calculation of the average of the motion vector calculated as a moving direction.

Starting the processing, the moving direction detecting means 106 waits for input of a picture from the surveillance camera 104. When a picture is input, the moving direction detecting means 106 checks whether a past picture is stored in the internal memory. In case no past pictures are stored in the internal memory, the moving direction detecting means 106 stores the input picture into the internal memory as a past picture and waits for input of next picture data. In case a past picture is already present, the xxx calculates the optical flow between the past picture and the input picture. The optical flow between two pictures is obtained by splitting a picture into a plurality of blocks and calculating from which location of a reference picture each block has moved, in representation of a motion vector field. How to calculate the optical flow is described for example in Ankyoin Takeshi, "Gazou no shori to ninshiki" Shokodo, P. 164.

For example, in FIG. 3, a picture 301 input at time t is stored in the internal memory as a past picture from the moving direction detecting means. Assuming that a picture 302 at time t+δ is input time δ milliseconds later, the picture at time t+δ is split into small bocks of eight by eight pixels and the pixel data of each block is compared with the pixel data around the corresponding block of the picture at time t and a block of eight by eight pixels with small variation volume is obtained to calculate the motion vector. By repeating the same processing on all the blocks of the picture at time t+δ, it is possible to calculate the field of motion vector of all blocks and an optical flow calculation result 303 is generated. In FIG. 3, a person who was in the lower section of a passage at time t was moving upward in the passage at time t+δ. As the optical flow of this case, a motion vector corresponding to the moving volume of the person is calculated for each block where the person is present.

The moving direction detecting means 106 calculates the average value of the motion vector calculated next as an optical flow and outputs the average value as the motion information on the tracking target to the moving direction transmitting means 107.

Operation of the moving direction transmitting means 107 is described below referring to FIG. 4.

Figure 4:
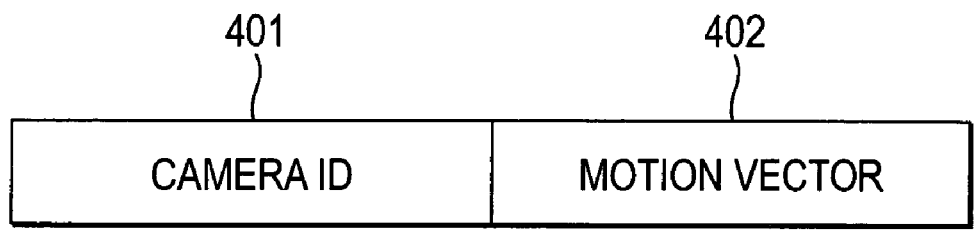
FIG. 4 shows the data structure of the moving direction information transmitted by the moving direction transmitting means 107 shown in FIG. 1.

FIG. 4 shows the data structure of the moving direction information transmitted by the moving direction transmitting means 107.

In FIG. 4, a numeral 401 represents a camera ID as a camera identifier, 402 a motion vector value of the tracking target calculated by the moving direction detecting means. The moving direction transmitting means 107 transmits the moving direction information to the surveillance terminal 102 via the network apparatus 103. The moving direction information is the data structure shown in FIG. 4 and comprises a set of the camera ID 401 and the motion vector 402.

The moving direction receiving means 109 on the surveillance terminal 102 receives the moving direction information from all camera servers connected to the network and outputs the information to the camera selection means 112.

Operation of the map information storage means 110 is described below referring to FIGS. 5 and 6.

Figure 5:
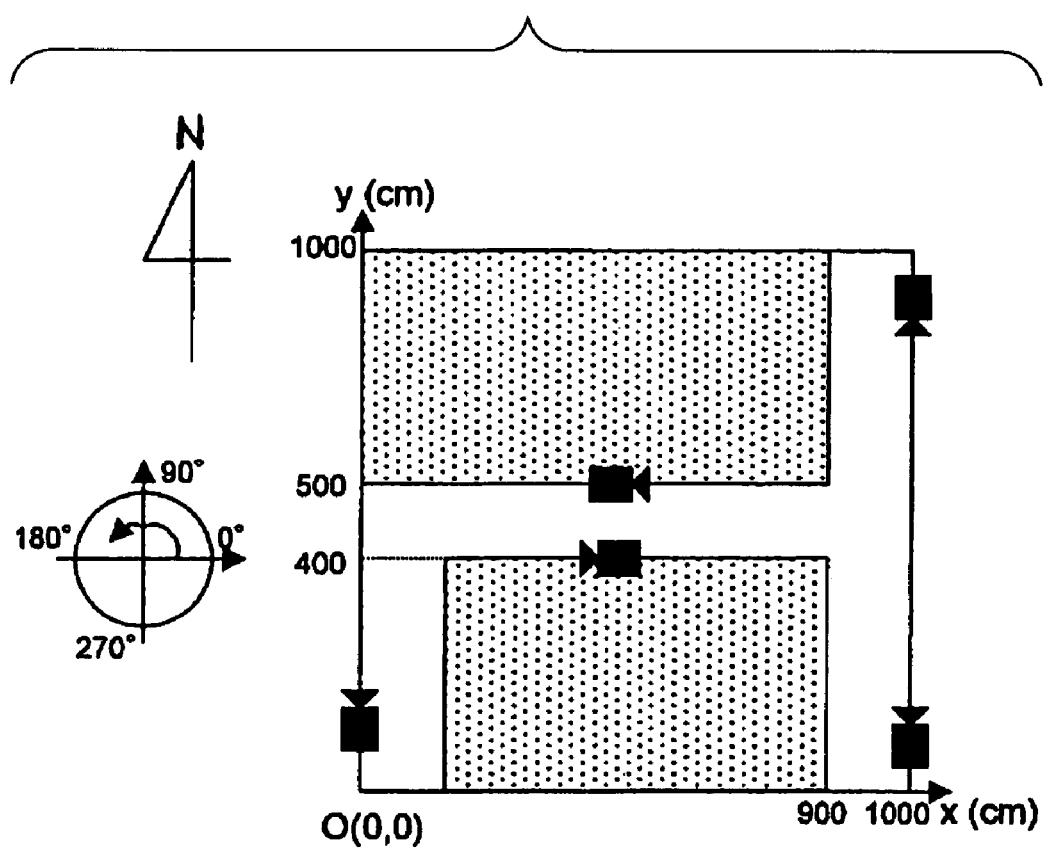
FIG. 5 shows an example of a surveillance zone for describing the operation of the map information storage means 110 shown in FIG. 1.

FIG. 5 shows an example of a surveillance zone for describing the operation of the map information storage means 110.

Figure 6:
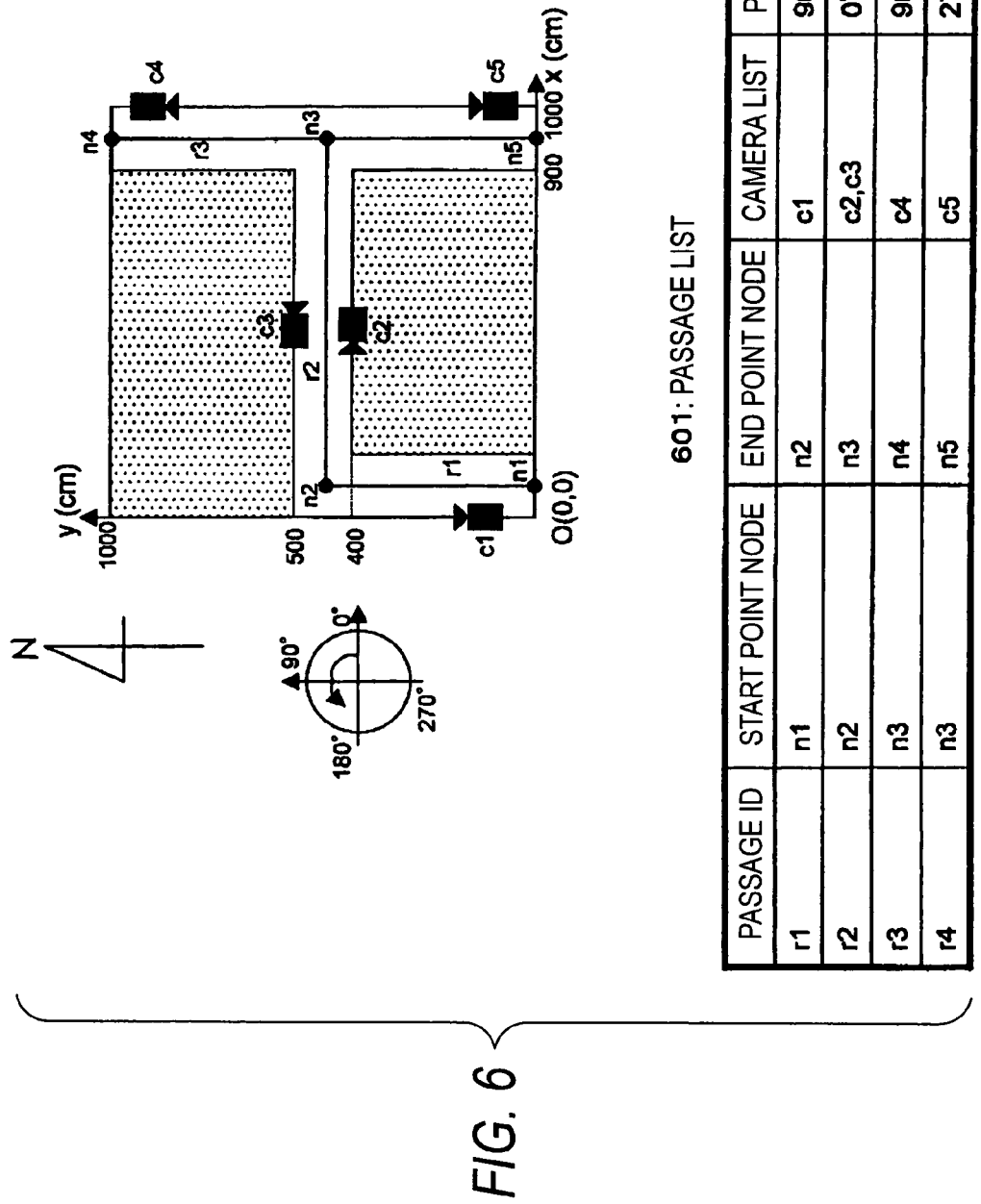
FIG. 6 shows the map information stored in the map information storage means 110 shown in FIG. 1.

FIG. 6 shows the data structure and an example of map information stored in the map information storage means 110.

In FIG. 6, a numeral 601 represents a passage list indicating the passage configuration information stored in the map information storage means 110.

Geographic information such as the passage configuration of a surveillance zone is stored in the map information storage means 110.

Operation of the map information storage means 110 is described below taking as an example a case where a passage 1 meter in width is present in a building 10 meters by 10 meters and surveillance is made using five cameras.

The map information storage means 110 stores a passage list 601 shown in FIG. 6. The passage list 601 comprises a passage ID as the identifier of the passage and a start point node as a start point of the passage, an end point node as an end point of the passage, a camera list which lists the cameras arranged over the passage from the start point to the end point, in the order of shooting. The direction of the passage indicates in which direction the passage runs from the start point to the end point, assuming that the east is at an angle of 0 degrees, the north 90 degrees, the west 180 degrees and the south 270 degrees counterclockwise.

In the environment shown in FIG. 5, four passages r1, r2, r3, r4 are registered as shown in the passage list 601.

Operation of camera location storage means 111 is described below referring to FIGS. 5 and 7.

Figure 7:
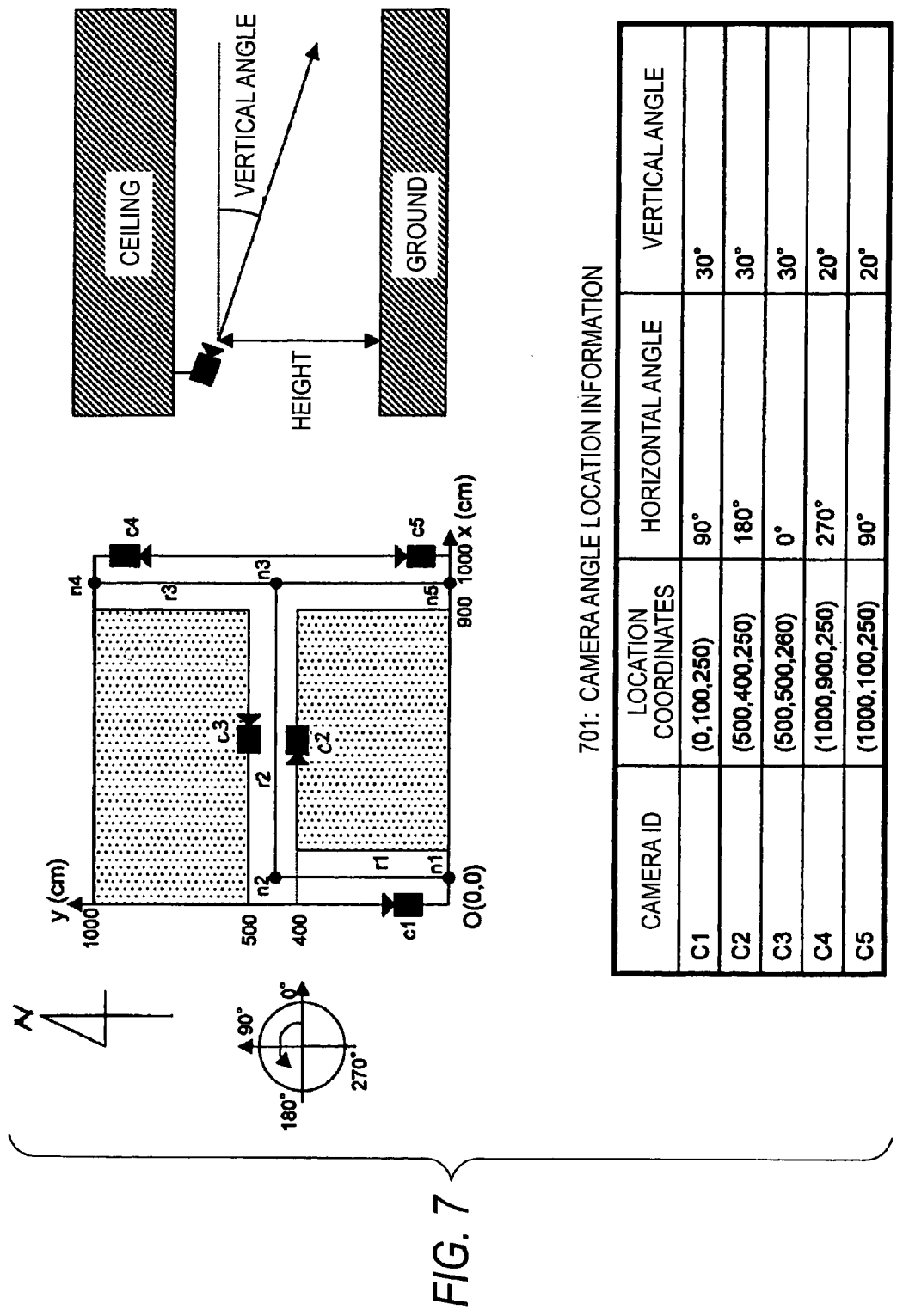
FIG. 7 shows the data structure and an example of camera location information stored in the camera location storage means 111 shown in FIG. 1.

FIG. 7 shows the data structure and an example of camera location information stored in the camera location storage means 111.

In FIG. 7, a numeral 701 represents camera location information indicating the camera location and camera angle.

The camera location storage means 111 stores the camera location information 701 shown in FIG. 7. The camera location information 701 comprises a camera ID as a camera identifier, location coordinates, a horizontal angle of the camera seen from directly above which is represented counterclockwise assuming that the east is 0 degrees, and a vertical angle of the camera seen in the direct lateral direction which is represented clockwise assuming that the level angle is 0 degrees. In the environment shown in FIG. 5, five cameras c1 through c5 are present and respective location coordinates and angles are as shown in the camera location information 701.

Operation of the camera selection means 112 is described below referring to FIGS. 8 through 14.

Figure 8:
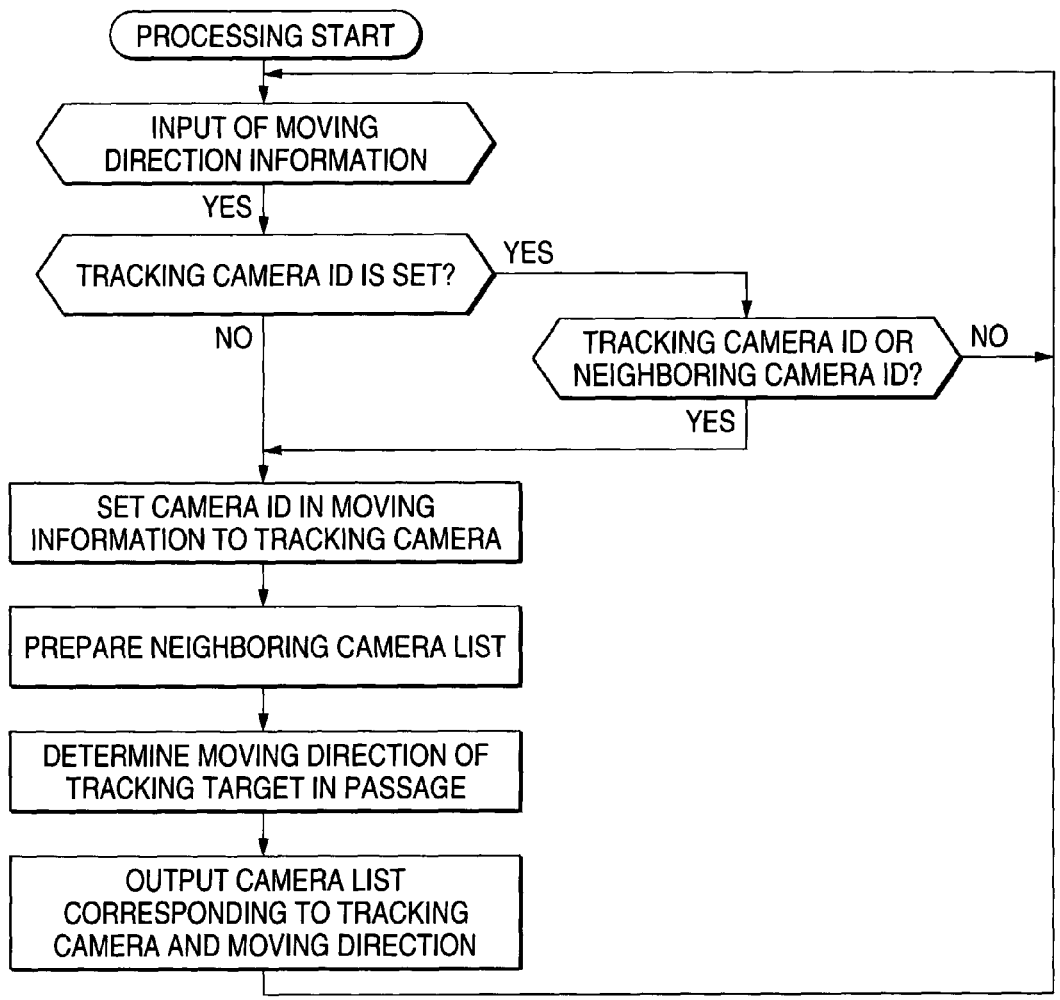
FIG. 8 shows the operation flow of the camera selection means 112 shown in FIG. 1.

FIG. 8 shows the operation flow of the camera selection means 112.

Figure 9:
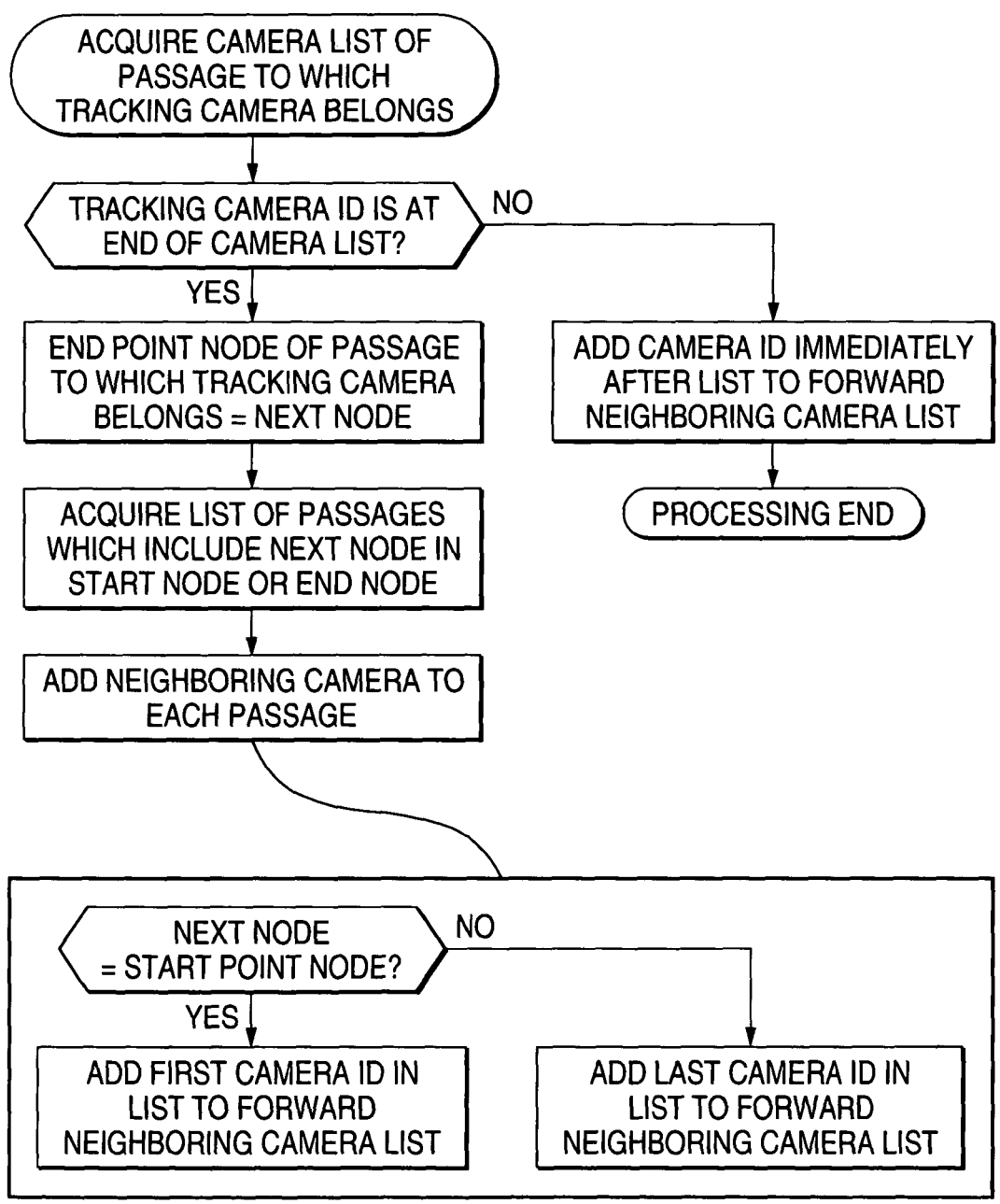
FIG. 9 shows an operation flow in which the camera selection means 112 shown in FIG. 1 prepares a forward neighboring camera list.

FIG. 9 shows an operation flow in which the camera selection means 112 prepares a forward neighboring camera list as the list information on the cameras neighboring in the passage direction in the passage list 601.

Figure 10:
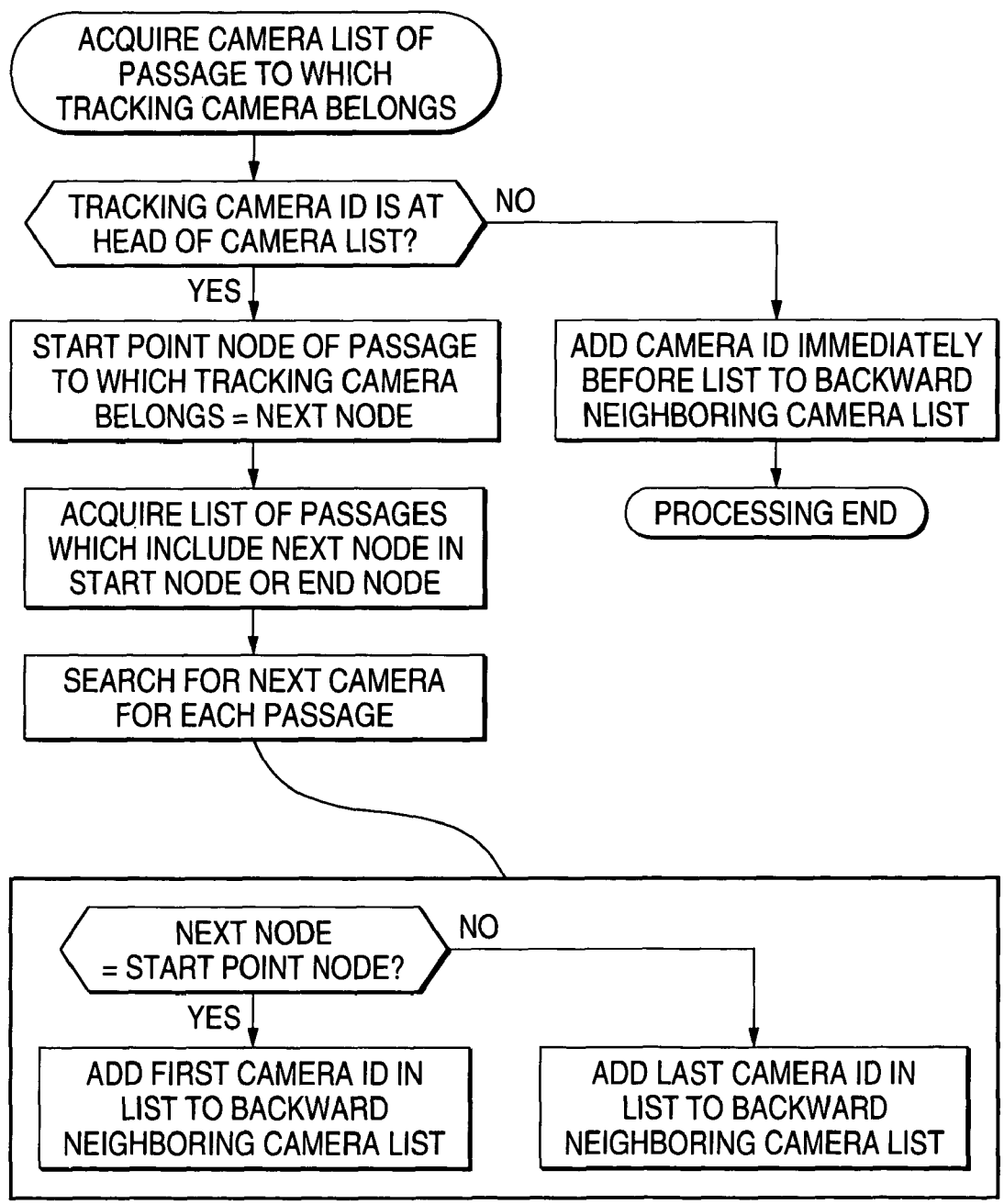
FIG. 10 shows an operation flow in which the camera selection means 112 shown in FIG. 1 prepares a backward neighboring camera list.

FIG. 10 shows an operation flow in which the camera selection means 112 prepares a backward neighboring camera list as the list information on the cameras neighboring in a direction different from the passage direction in the passage list 601.

Figure 11:
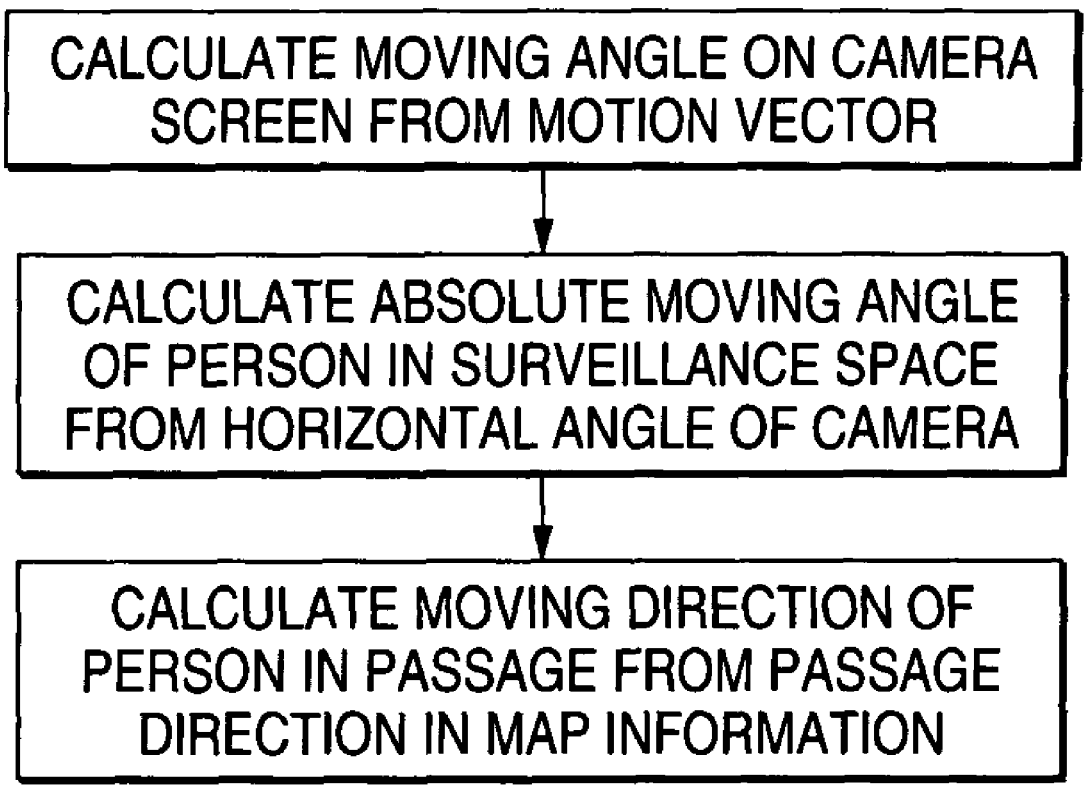
FIG. 11 shows an operation flow in which the camera selection means 112 shown in FIG. 1 determines the moving direction in the passage.

FIG. 11 shows an operation flow in which the camera selection means 112 determines the moving direction of the tracking target in the passage.

Figure 12:
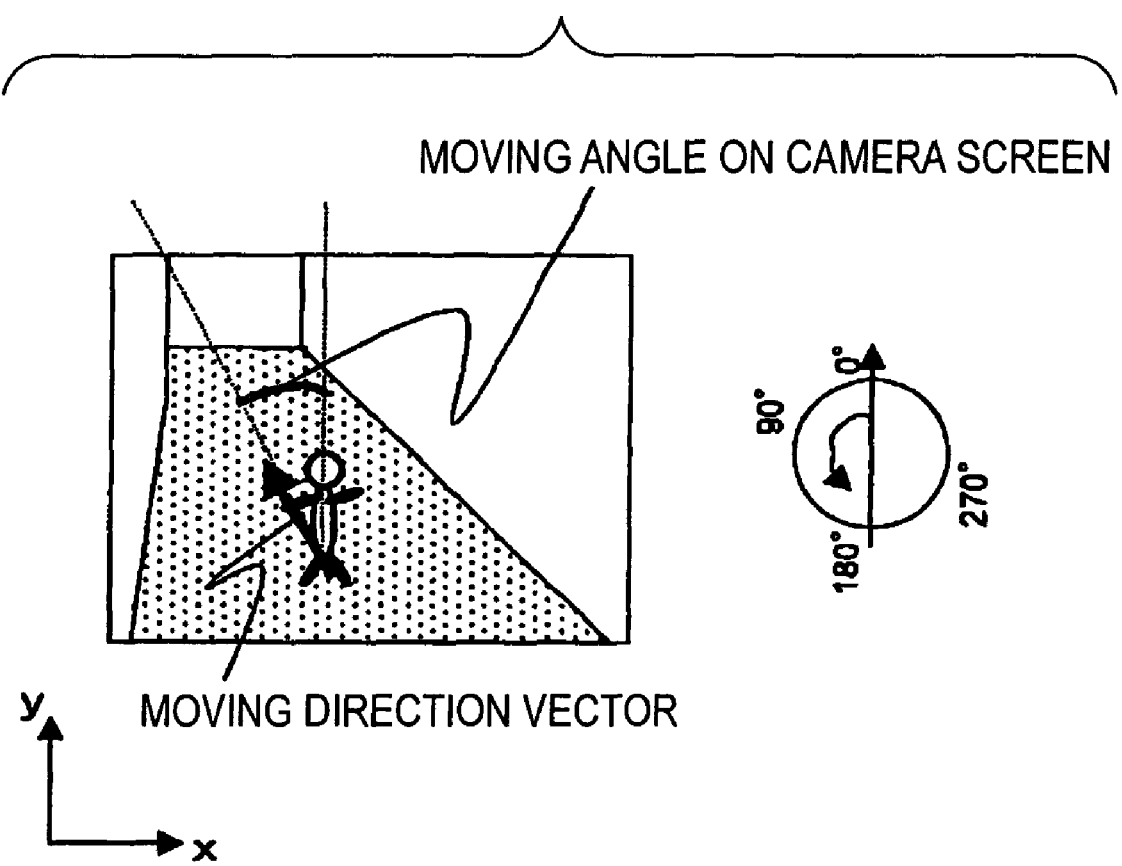
FIG. 12 shows a method whereby the camera selection means 112 shown in FIG. 1 calculates a moving angle on the camera screen.

FIG. 12 shows a method whereby the camera selection means 112 calculates a moving angle on the camera screen from the moving direction vector.

Figure 13:
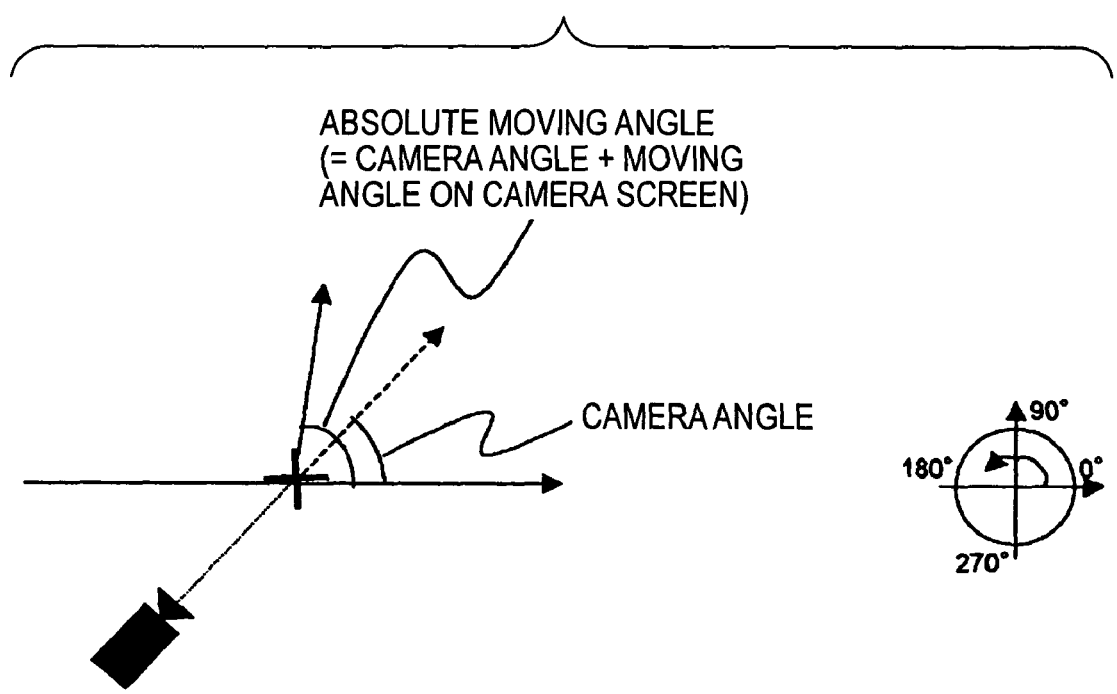
FIG. 13 shows a method whereby the camera selection means 112 shown in FIG. 1 calculates the absolute moving angle.

FIG. 13 shows a method whereby the camera selection means 112 calculates the absolute moving angle of the tracking target in the surveillance space.

Figure 14:
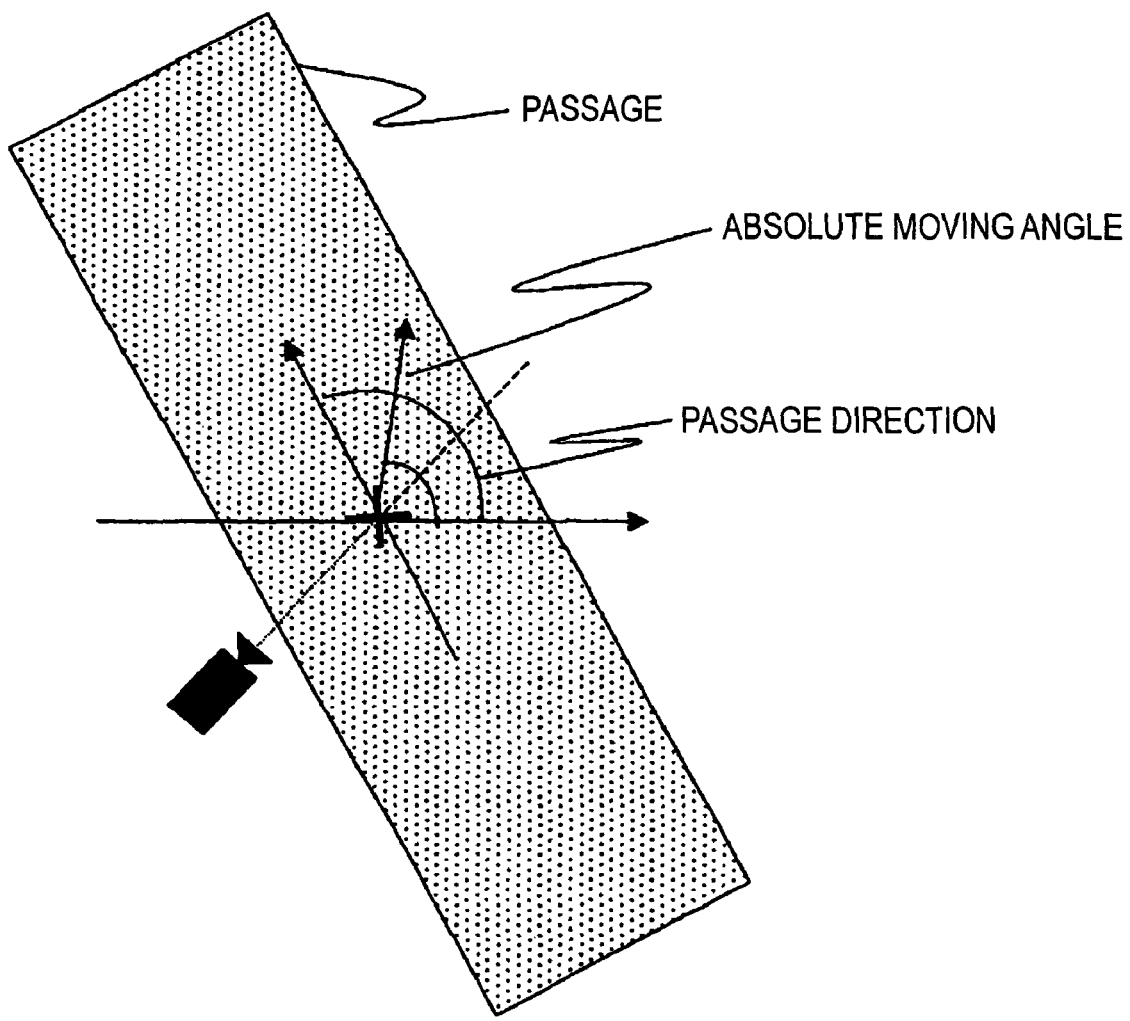
FIG. 14 shows a method whereby the camera selection means 112 shown in FIG. 1 determines the moving direction in the passage.

FIG. 14 shows a method whereby the camera selection means 112 determines the moving direction of the tracking target in the passage.

Starting the processing, the camera selection means 112 waits for input of moving direction information from the moving direction receiving means 109. When moving direction information is input, unless a tracking camera ID is set in the internal memory, the camera selection means 112 sets the camera ID 401 in the moving direction information as a tracking camera Id and prepares a neighboring camera list as a list of cameras which neighbor the tracking camera. The neighboring camera list comprises a forward neighboring camera list as a list of camera IDs which can shoot the tracking target next when the tracking target has moved in the direction matching the passage direction shown in the passage list 601 and a backward neighboring camera list as a list of camera IDs which can shoot the tracking target next when the tracking target has moved in the direction different from the passage direction shown in the passage list 601.

FIG. 9 shows an operation flow in which the camera selection means 112 prepares a forward neighboring camera list.

The camera selection means 112 searches for a passage containing a tracking camera ID from the passage list 601 and acquires a camera list of the corresponding passage. Unless the tracking camera ID is at the end of the camera list acquired, the camera selection means 112 adds the camera ID just after the tracking camera ID as the sole element in the forward neighboring camera list and completes list preparation. In case the tracking camera ID is at the end of the camera list acquired, the camera selection means 112 determines that no neighboring cameras are present in the passage where the tracking camera is located and searches for neighboring passages. A list of neighboring passages is acquired as a passage list which assumes that the end point node of a passage containing the tracking camera ID is a next node and which contains the next node as a start point node or end point node. In case the next node is a start point node of an acquired neighboring passage, the camera selection means 112 adds the first camera ID in the camera list of this passage to the forward neighboring camera list. In case the next node is an end point node, the camera selection means 112 adds the last camera ID in the camera list of this passage to the forward neighboring camera list. In this way, the camera selection means 112 prepares the forward neighboring camera list.

FIG. 10 shows an operation flow in which the camera selection means 112 prepares a backward neighboring camera list.

The camera selection means 112 searches for a passage containing a tracking camera ID from the passage list 601 and acquires a camera list of the corresponding passage. Unless the tracking camera ID is at the head of the camera list acquired, the camera selection means 112 adds the camera ID just before the tracking camera ID as the sole element in the backward neighboring camera list and completes list preparation. In case the tracking camera ID is at the head of the camera list acquired, the camera selection means 112 determines that no neighboring cameras are present in the passage where the tracking camera is located and searches for neighboring passages. A list of neighboring passages is acquired as a passage list which assumes that the end point node of a passage containing the tracking camera ID is a next node and which contains the next node as a start point node or end point node. In case the next node is a start point node of an acquired neighboring passage, the camera selection means 112 adds the first camera ID in the camera list of this passage to the backward neighboring camera list. In case the next node is an end point node, the camera selection means 112 adds the last camera ID in the camera list of this passage to the backward neighboring camera list. In this way, the camera selection means 112 prepares the backward neighboring camera list.

FIG. 11 shows an operation flow in which the camera selection means 112 determines the moving direction of the tracking target in the passage from the motion vector 402 in the moving direction information input from the moving direction receiving means.

The camera selection means 112 calculates the moving angle of the tracking target on the camera screen from the motion vector 402 in the input moving direction information. Next, the camera selection means 112 calculates the absolute moving angle of the tracking target in the surveillance space from moving angle of the tracking target on the camera screen and the horizontal angle in the camera location information 701. The camera selection means 112 compares the absolute moving angle with the passage direction of a passage where the tracking camera stored in the surveillance space is located and determines whether the person is moving forward or backward with respect to the passage direction.

FIG. 12 shows a method for calculating the moving angle of the tracking target on the camera screen. The moving angle on the screen is calculated from the angle indicated by the motion vector assuming that the angle of upward moving of the tracking target with respect to the screen is 0 degrees. The motion angle θ is calculated assuming that the motion vector V=(Vx, Vy) by using the following expression 1:

Moving angle θ=$a\tan(-Vx/Vy)$ (Expression 1)

FIG. 13 shows a method for calculating the absolute moving angle. The absolute moving angle is a value obtained by adding the horizontal angle of the camera to the moving angle on the screen, because in case the moving direction of the tracking target on the camera screen is 0 degrees and the tracking target has moved upward on the camera screen, the tracking target moves in the same direction as the horizontal angle of the camera. The absolute moving angle is calculated assuming the east as 0 degrees by using the following expression 2:

Absolute moving angle=horizontal angle of the camera+moving angle on the camera screen (Expression 2)

FIG. 14 shows a method for determining the moving direction of the tracking target in the passage. The moving direction in the passage is determined by acquiring the passage direction of a passage where the tracking camera is located from the passage list 601 and comparing the passage direction with the absolute moving angle of the tracking target. In case the absolute value of the difference between the passage direction and the absolute moving angle is 90 degrees or less, it is determined that the tracking target is moving forward. In case the value is greater than 90 degrees, it is determined that the tracking target is moving backward with respect to the passage direction.

The camera selection means 112 determines the forward neighboring camera list in case the moving direction of the tracking target is forward direction or the backward neighboring camera list in case the moving direction of the tracking target is backward direction, as a list of cameras which can shoot the tracking target next, and outputs the list together with the tracking camera ID to the screen composition means.

In case the tracking camera ID is set when the moving direction information is input, the camera selection means 112 checks the camera ID in the moving direction information against the tracking camera ID, a camera ID in the forward neighboring camera list or backward neighboring camera list. In case matching is not obtained, the camera selection means 112 determines that the moving direction information does not pertain to the current tracking target and waits for input of new moving direction information.

Operation of the screen composition means 113 is described below referring to FIGS. 15 and 16.

Figure 15:
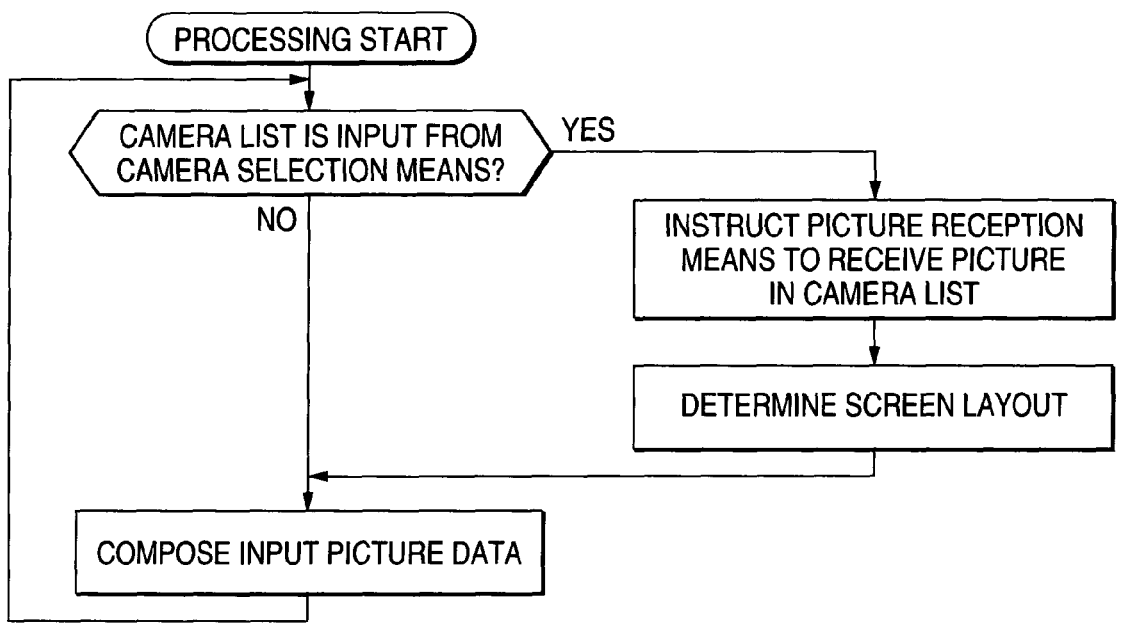
FIG. 15 shows the operation flow of the screen composition means 113 shown in FIG. 1.

FIG. 15 shows the operation flow of the screen composition means 113.

Figure 16A:
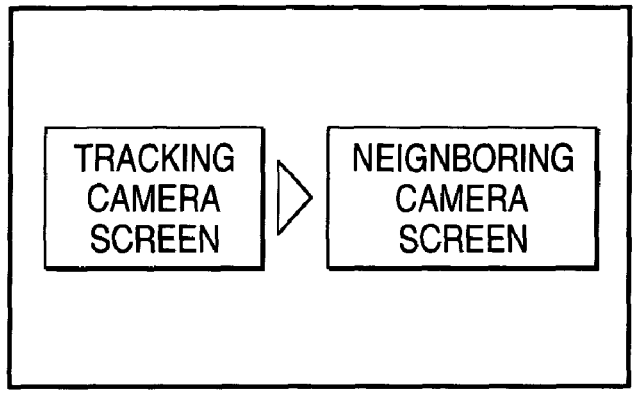
FIGS. 16A to 16C show examples of screen layout is created by the screen composition means 113 shown in FIG. 1.
Figure 16B:
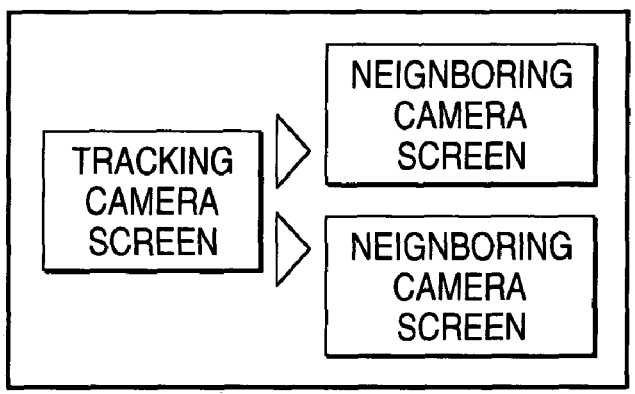
Figure 16C:
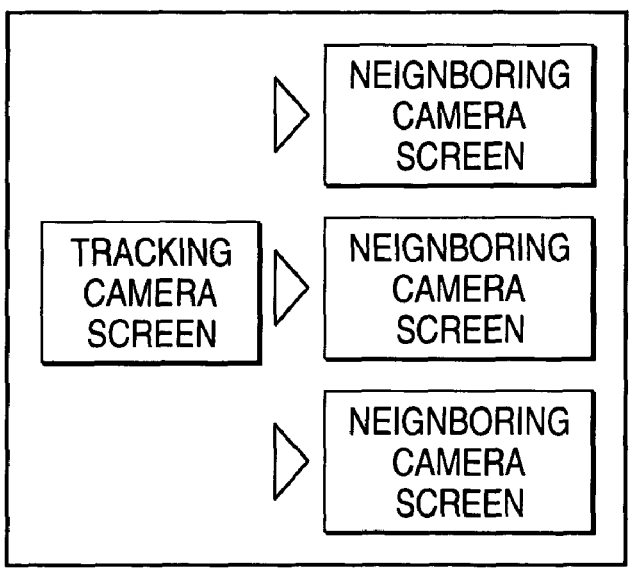

FIGS. 16A to 16C show examples of a screen layout created by the screen composition means 113.

The screen composition means 113 synthesizes camera pictures in accordance with the tracking camera ID and the neighboring camera list output from a camera selection means 112 and outputs the resulting picture to the screen display means 114.

Starting the processing, the screen composition means 113 checks for an input from the camera selection means 112. In case a camera list is input, the screen composition means 113 transmits to picture reception means an instruction to receive the camera pictures. Next, the screen composition means 113 determines the screen layout in accordance with the number of camera screens input and assigns a camera ID to each screen location. FIGS. 16A to 16C show screen layouts. FIG. 16A shows the layout used when a single neighboring camera is used. This layout displays a picture from a tracking camera on the left and a picture from the neighboring camera in the same size as that on the left. FIG. 16B shows the layout used when two neighboring cameras are used. This layout displays pictures from the two cameras (top/bottom) on the right, in the same size as that on the left. FIG. 16C shows the layout used when three neighboring cameras are used. This layout displays pictures from the three cameras (top/bottom) on the right, in the quarter size that of the picture from the tracking camera. In case more than three neighboring cameras are used, the pictures are displayed in an appropriate size on the screen as required.

Determining the screen layout, the screen composition means 113 arranges the picture data input from the picture reception means 108 in accordance with the screen layout and outputs the picture data to the screen display means 114. In case a new camera list is not input from the camera selection means, the screen composition means 113 synthesizes the pictures in the same screen layout as the last shooting and outputs the resulting picture to the screen display means 114.

The picture reception means 108 is provided as many as the number of pictures which can be synthesized by a picture terminal. The picture reception means 108, receiving a picture reception instruction from the screen composition means 113, checks whether the currently received camera ID is the same as the camera ID received anew. In case the IDs differ from each other, the picture reception means 108 transmits a picture transmission end notice to the camera server from which pictures are currently received and makes a request for start of transmission of pictures to the camera server corresponding to the new camera ID. After the request for start of transmission of pictures, the picture reception means 108 receives pictures from the camera server and keeps outputting the received picture data to the screen composition means 113.

The screen display means 114 displays the input picture data on the screen of the display terminal.

Figure 17A:
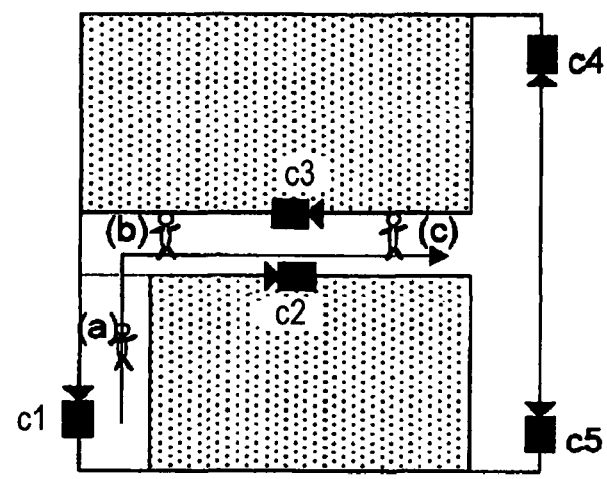
FIGS. 17A and 17B show an operation example of the video surveillance system shown in FIG. 1.
Figure 17B:
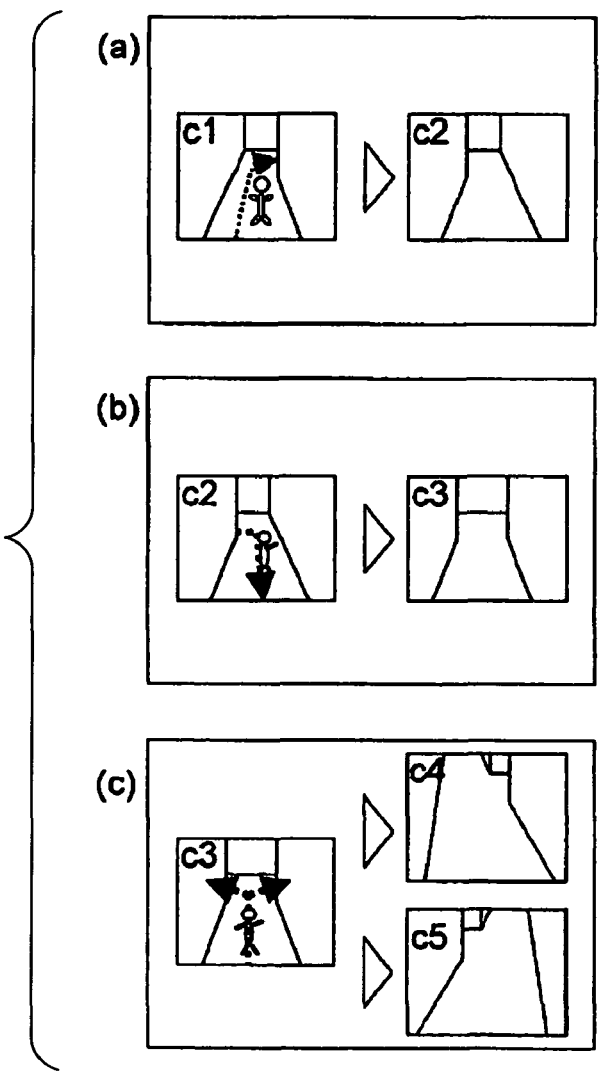

FIGS. 17A and 17B show an operation example of the surveillance picture monitoring apparatus thus configured.

In case the tracking target has moved in accordance with the moving example shown in FIG. 17A, the screens shown in FIG. 17B are output on the surveillance terminal screen in the locations (a), (b) and (c) of FIG. 17A. In the location (a), a picture from the camera c1 is displayed on the left as a picture from the tracking camera and a picture from the camera c2 in the moving direction of the tracking target is displayed n the right. When the person moves to the location (b), the tracking camera is switched to c2 and a picture from the camera c3 in the moving direction is displayed as a neighboring camera on the right. When the person moves to the location (c), a picture from the camera c3 as a tracking camera is displayed as and pictures from the cameras c4 and c5 on the branch passages in the moving direction are displayed on the right as pictures from the neighboring cameras.

In this way, the surveillance picture monitoring apparatus according to the first embodiment comprises moving direction detecting means for detecting the moving direction of a tracking target on the camera screen, map information storage means for storing the passage configuration of the surveillance environment, camera location storage means for storing the camera location information, and camera selection means for selecting a camera which will shoot the tracking target next in accordance with the moving direction of the tracking target by using the map information and camera location information. Thus the tracking target and the picture from a camera which will shoot the tracking target next are displayed on the surveillance terminal. This provides a surveillance system which assures that the surveyor will never lose track of the tracking target.

While the first embodiment displays a picture from a single camera which will probably shoot the tracking target next, it is possible to acquire a list of cameras which can shoot the tracking target after the next camera by preparing a neighboring camera list in a similar way for the camera IDs in the camera list prepared using the method shown in FIGS. 9 and 10.

Figure 18A:
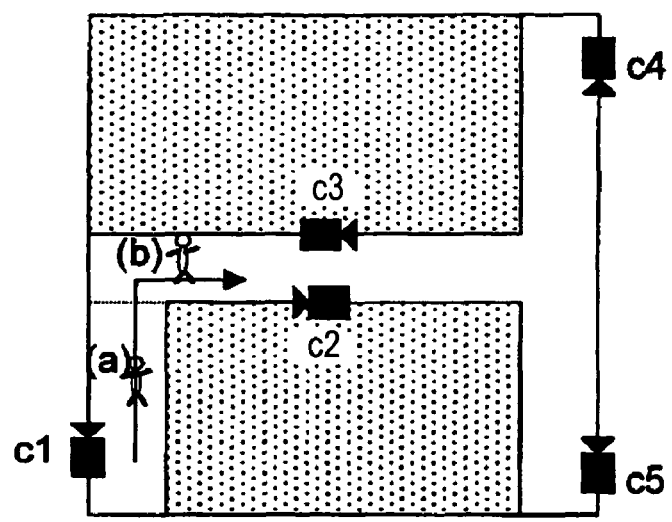
FIGS. 18A and 18B show an operation example of a case where the number of displayed cameras are increased in the video surveillance system shown in FIG. 1.
Figure 18B:
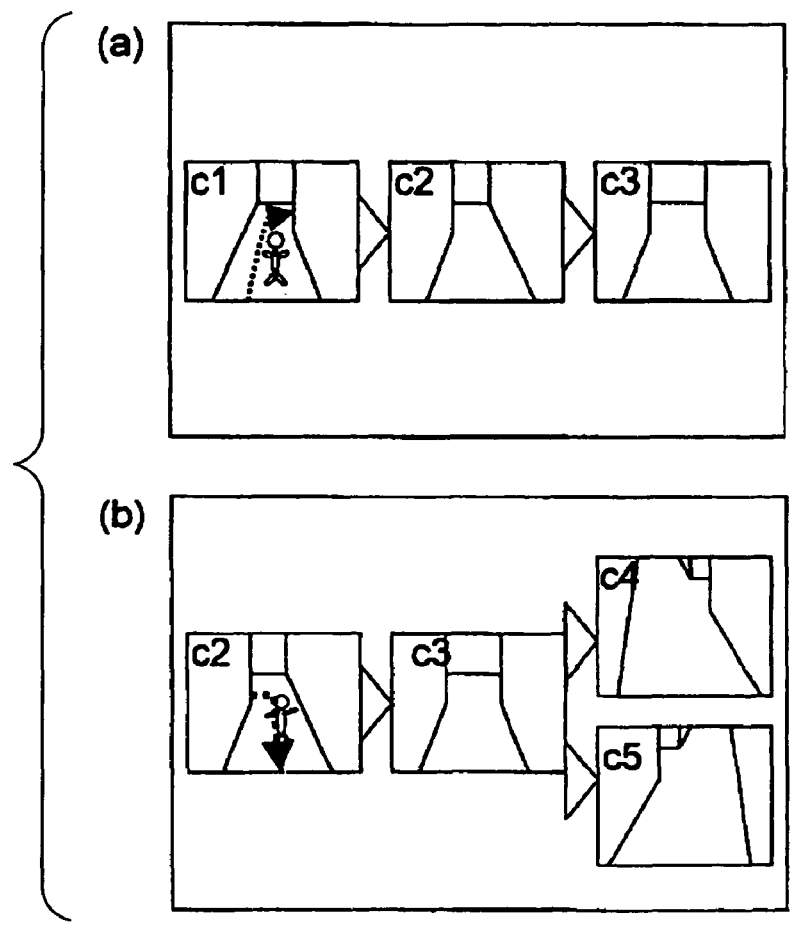

FIGS. 18A and 18B show an example of screen where pictures from the first and second cameras which will shoot the tracking target are output.

In FIGS. 18A and 18B, when the person under surveillance is in the location (a), pictures from the camera c1 currently shooting the person, the camera c2 which will shoot the person next and the camera c3 which will shoot the person following the camera c2 are displayed on the screen, as shown in the screen example (a). When the tracking target moves to the location (b), pictures from the camera c1 currently shooting the person, the camera c2 which will shoot the person next and two cameras c4, c5 which can shoot the person after branching are displayed on the screen of the surveillance terminal. In this way, by recursively executing the camera list preparation processing on the camera selection means 112, preparing a camera list including up to the nth camera, and synthesizing camera pictures up to the nth camera on the screen composition means 113, it is also possible, according to the invention, to display the expected paths of the n cameras on the terminal screen.

While the first embodiment displays pictures from the camera shooting the tracking target and the camera which will shoot the tracking target next, by storing the camera ID which was tracking the tracking target last time on the camera selection means 112, it is possible to display a picture from a camera which used to shoot the tracking target.

Figure 19A:
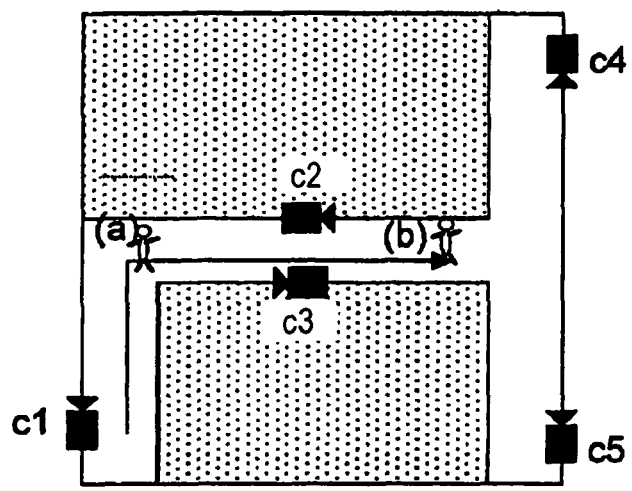
FIGS. 19A and 19B show an operation example of a case where a picture from the camera which was shooting last in the video surveillance system shown in FIG. 1.
Figure 19B:
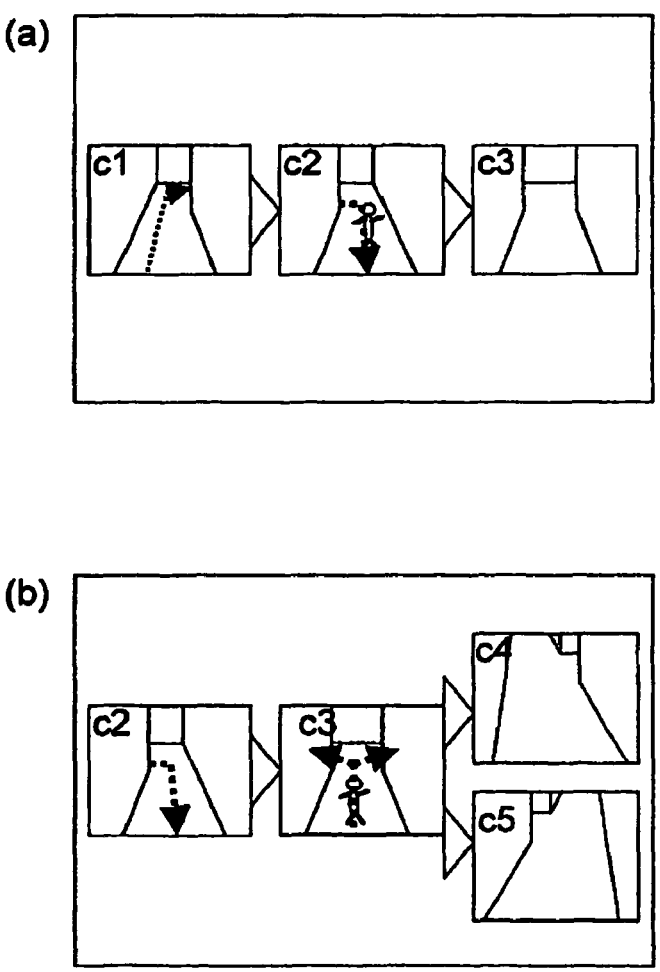

FIGS. 19A and 19B show a screen example used in a case where a picture from the camera which was shooting the tracking target and a picture from the camera currently shooting the tracking target are displayed at the same time. When the person under surveillance is in the location (a), pictures from the camera c1 which was shooting the tracking target last time, the camera c2 currently shooting the person, and the camera c3 which will shoot the person next are displayed on the screen, as shown in the screen example (a). When the tracking target moves to the location (b), pictures from the camera c2 which was shooting the tracking target in the location (a), the camera c3 currently shooting the person, and two cameras c4, c5 which can shoot the person after branching are displayed. In this way, by storing the camera IDs which was tracking the tracking target on the camera selection means 112, it is also possible, according to the invention, to simultaneously display a camera picture showing the past moving path and another camera picture showing the expected path on the terminal screen.

While the first embodiment uses a fixed camera whose angle does not change, it is also possible, according to the invention, to use a camera equipped with a pan/tilt feature by acquiring the angle from the camera and periodically updating the camera location information 701.

Embodiment 2

A video surveillance system according to the second embodiment is described below referring to FIGS. 20 through 26.

Figure 20:
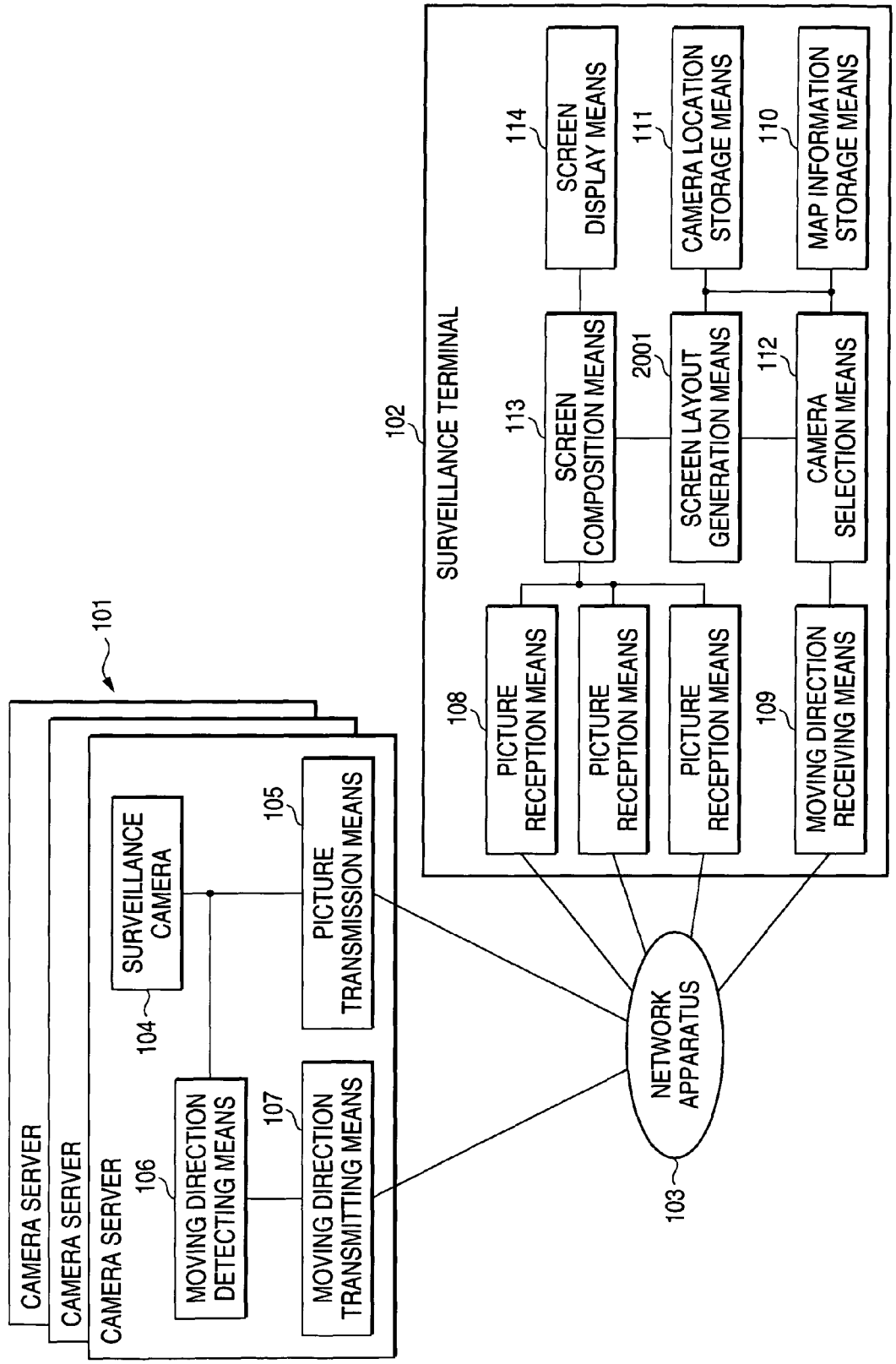
FIG. 20 is a block diagram of a video surveillance system according to the second embodiment of the invention.

FIG. 20 is a block diagram of a video surveillance system according to the second embodiment of the invention.

In FIG. 20, numerals 101 through 114 are same as those in the first video surveillance system in the first embodiment shown in FIG. 1.

A numeral 2001 represents screen layout generation means for generating the arrangement layout of a camera selected by the camera selection means 112.

Operation of the screen layout generation means 2001 is described below referring to FIGS. 21 through 25.

Figure 21:
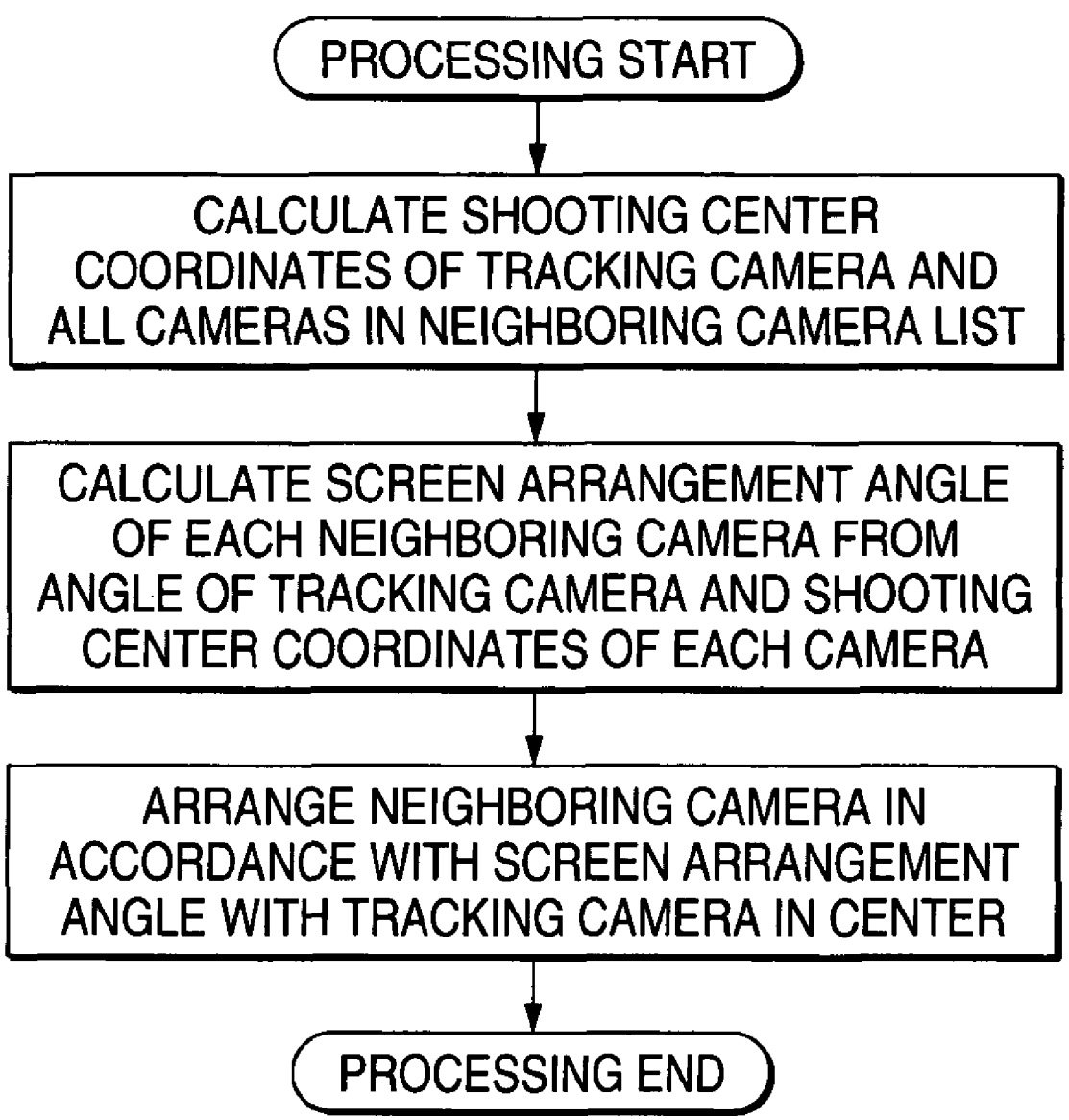
FIG. 21 shows the operation flow of the screen layout generation means 2001 shown in FIG. 20.

FIG. 21 shows the operation flow of the screen layout generation means 2001.

Figure 22A:
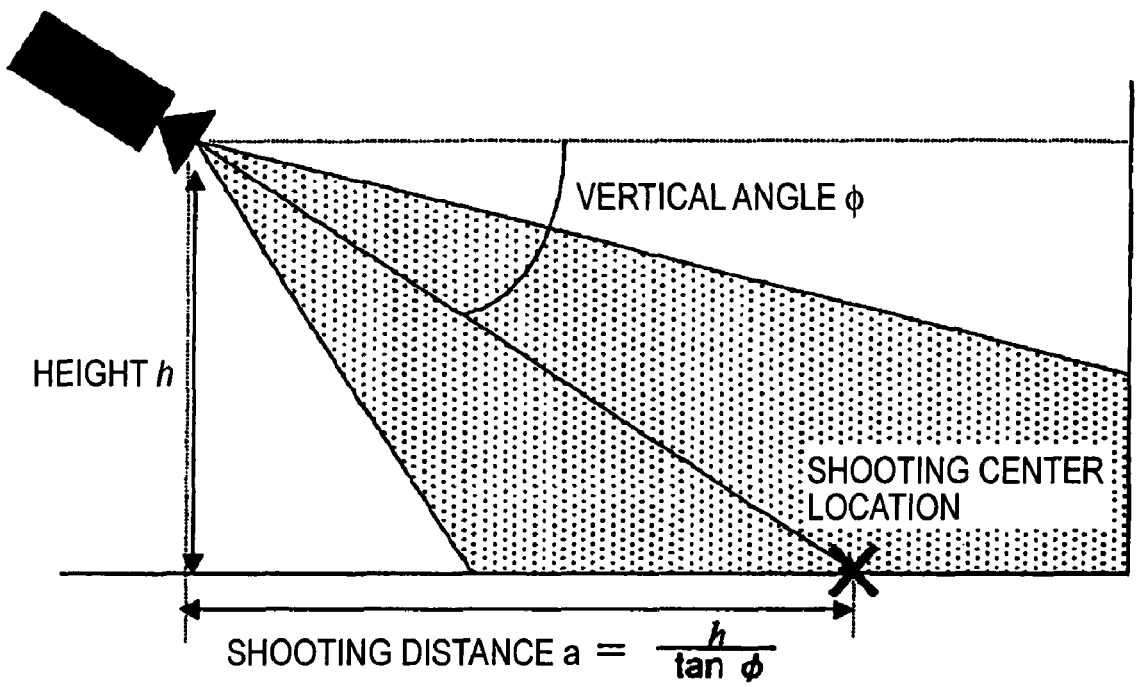
FIGS. 22A and 22B show a method whereby the screen layout generation means 2001 shown in FIG. 20 calculates the shooting center coordinates.
Figure 22B:
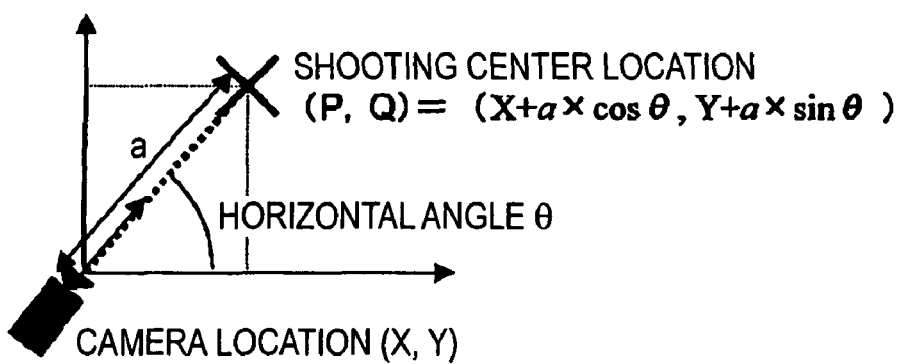

FIGS. 22A and 22B show a method whereby the screen layout generation means 2001 calculates the shooting center coordinates of the camera.

Figure 23:
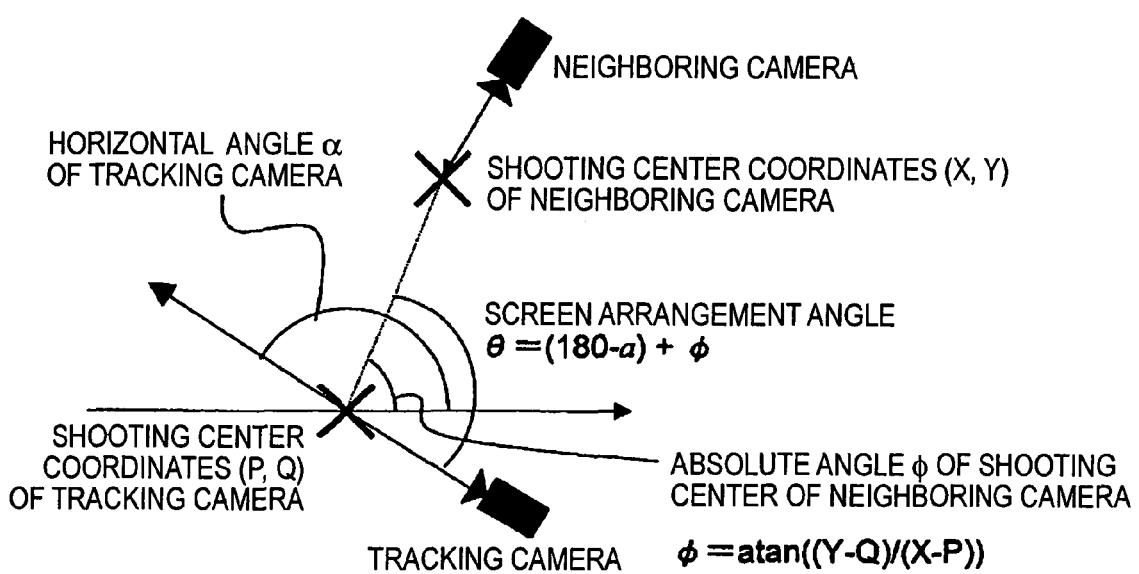
FIG. 23 shows a method whereby the screen layout generation means 2001 shown in FIG. 20 calculates the screen arrangement angle.

FIG. 23 shows a method whereby the screen layout generation means 2001 calculates the screen arrangement angle of the neighboring camera.

Figure 24A:
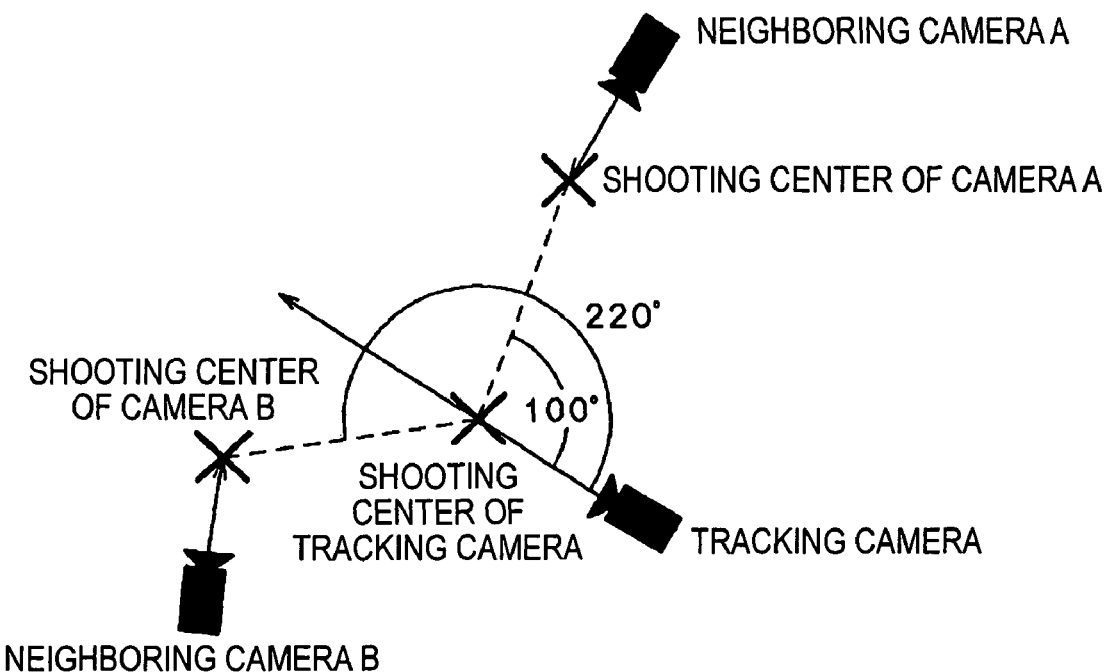
FIGS. 24A and 24B show an operation example of the screen layout generation means 2001 shown in FIG. 20.
Figure 24B:
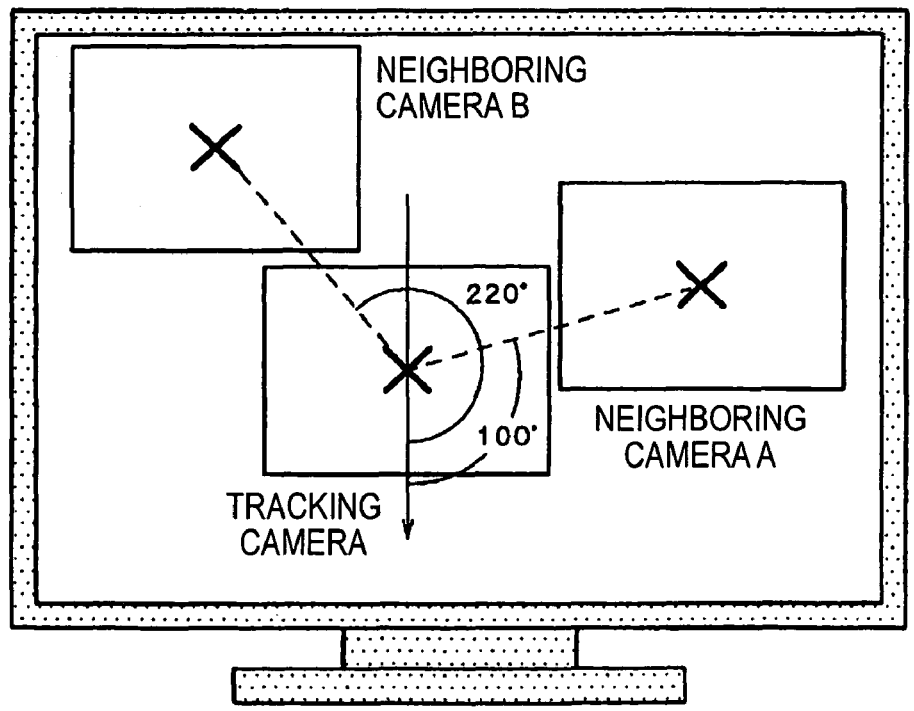

FIGS. 24A and 24B show an operation example of the screen layout generation means 2001.

The screen layout generation means 2001 generates layout information for arranging a camera picture on the screen for easy understanding of the real positional relationship among the tracking camera and the neighboring cameras.

The screen layout generation means 2001 calculates the center location coordinates of shooting by the tracking camera and the cameras in the neighboring camera list input from the camera selection means based on the camera location information 701.

FIGS. 22A and 22B show a method for calculating the shooting center coordinates.

As shown in FIG. 22A, the shooting distance a as a distance from the camera location on the ground to the shooting center coordinates is calculated from the vertical angle $\phi$ and the camera height h as the z-axis value of the camera coordinates in the camera location information 701 by using the following expression 3:

$$a = h/(\tan \phi) \quad \text{(Expression 3)}$$

As shown in FIG. 22B, the camera shooting center coordinates (P,Q) is calculated from the x and y coordinates of camera location (X,Y), camera angle $\theta$ and the shooting distance a by using the following expression 4:

$$(P,Q) = (X + a \times \cos \theta, Y + a \times \sin \theta) \quad \text{(Expression 4)}$$

The screen layout generation means 2001 calculates the shooting center coordinates then calculates the screen arrangement angle of each camera in the neighboring camera list from the angle of the tracking camera and the shooting center coordinates.

FIG. 23 shows a method for calculating the screen arrangement angle of the neighboring camera.

Assuming that the shooting center coordinates of the tracking camera is (P,Q) and the shooting center coordinates of the neighboring camera for calculating the screen location is (X,Y), the absolute angle of the shooting center coordinates of the neighboring camera obtained in case it is assumed that the shooting center coordinates of the tracking camera is an origin is calculated by using the following expression 5:

$$\phi = a\tan((Y-Q)/(X-P)) \quad \text{(Expression 5)}$$

The screen arrangement angle $\theta$ is calculated from the horizontal angle a and the absolute angle $\phi$ of the shooting center coordinates of the neighboring camera by using the following expression 6:

$$\theta = (180 - a) + \phi \quad \text{(Expression 6)}$$

The screen layout generation means 2001 generates the layout information for arranging each neighboring camera screen in accordance with the calculated screen arrangement angle $\theta$.

FIGS. 24A and 24B show an example of layout information generated by the screen layout generation means 2001.

First, the screen layout generation means 2001 arranges the tracking camera screen near the center of the screen. Then the screen layout generation means 2001 arranges the neighboring camera screens at locations where the angle between the straight line connecting the center of each neighboring camera screen and the straight line starting with the center of the tracking camera screen and directed downward (0 degrees) is equal to the corresponding screen arrangement angle.

In FIGS. 24A and 24B, two cameras are included in the neighboring camera list. This is a screen arrangement example where the screen arrangement angle of the first camera A is 100 degrees and that of the second camera B is 220 degrees. As shown in the screen arrangement example FIG. 24B, the angle between the straight line connecting the center of the camera A screen and the straight line starting with the center of the tracking camera screen and is directed downward is 100 degrees. The angle between the straight line connecting the center of the camera B screen and the straight line starting with the center of the tracking camera screen and directed downward is 220 degrees.

Figure 25A:
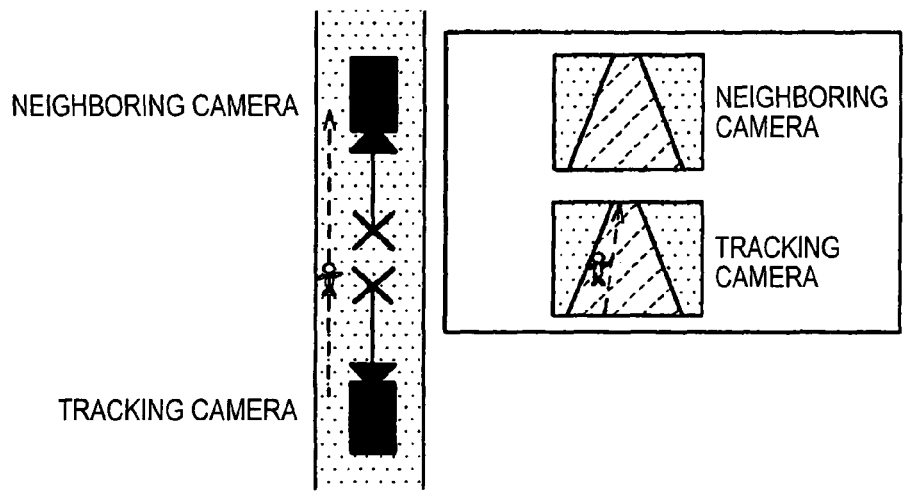
FIGS. 25A to 25C show examples of screen arrangement angle and display screen in a typical surveillance environment for the video surveillance system shown in FIG. 20.
Figure 25B:
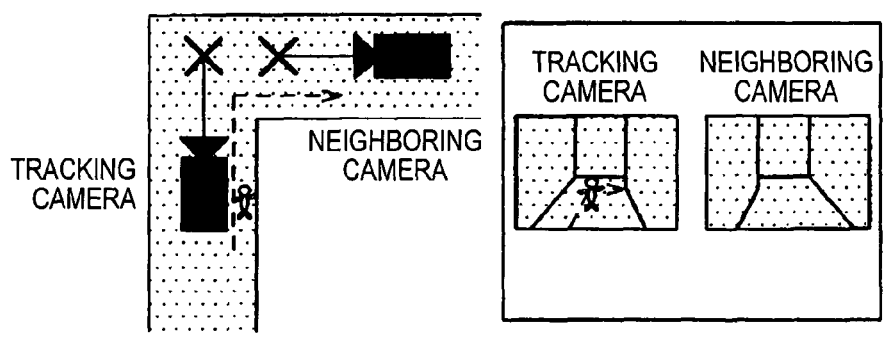
Figure 25C:
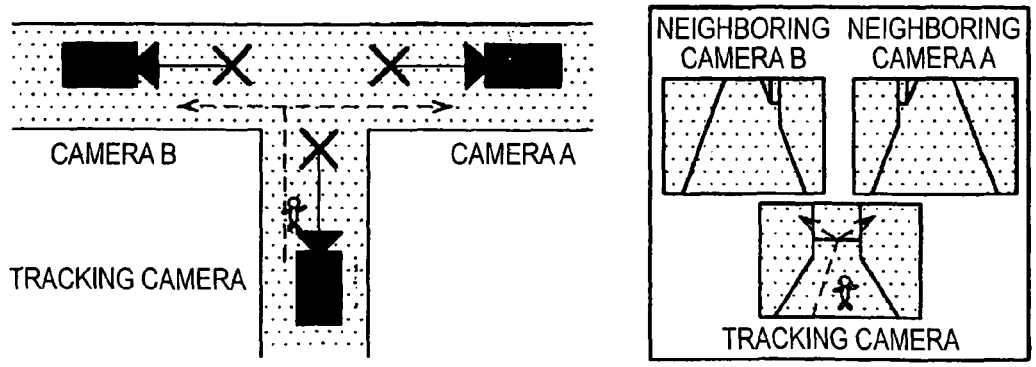

FIGS. 25A to 25C show an operation example in a typical camera installation.

In FIG. 25A, two cameras are located facing each other in a passage of a straight line. The screen arrangement angle of the neighboring camera is 180 degrees and the neighboring camera screen is arranged above the tracking camera screen. When the tracking target moves in the passage, the tracking target moves upward and is tracked upward then appears on the neighboring camera screen as the next camera's screen. It is thus possible to smoothly guide the line of sight of the surveyor to the next camera screen in accordance with the moving of the tracking target.

In FIG. 25B, two cameras are arranged facing each other in an L-shaped passage. The screen arrangement angle of the neighboring camera is 90 degrees and the neighboring camera screen is arranged to the right of the tracking screen. When the tracking target moves in the passage, the person moves upward then rightward on the tracking camera screen then disappears from the screen. Then the person appears on the neighboring camera screen. The surveyor has to just move his/her line of sight rightward as the person disappears to capture the person in his/her sight.

In FIG. 25C, three cameras are arranged facing each other in a T-shaped passage. The screen arrangement angle of the neighboring camera A is 135 degrees and that of the neighboring camera B is 225 degrees. In the example of FIG. 25C, the tracking target will turn to the left or right. In either case, it is possible to capture the neighboring camera screen where the person will appear by tracking the person on the tracking camera screen. Thus the surveyor can well keep track of the starching object when the monitor screen is switched.

In this way, according to the second embodiment, the screen layout generation means 2001 for generating an arrangement layout of camera screens is provided on the surveillance terminal in order to reflect the installation locations of surveillance cameras. As a result, a video surveillance system is provided where, even in case the tracking target has moved and the shooting camera has changed, the surveyor can keep track of the tracking target.

In the embodiment, when arranging neighboring camera screens, the screen layout generation means 2001 may determine the size of a neighboring camera screen or determine the distance of the neighboring screen from the tracking camera screen in accordance with the distance between the shooting center coordinates of the tracking camera and the shooting center coordinates of the neighboring camera screen.

Figure 26A:
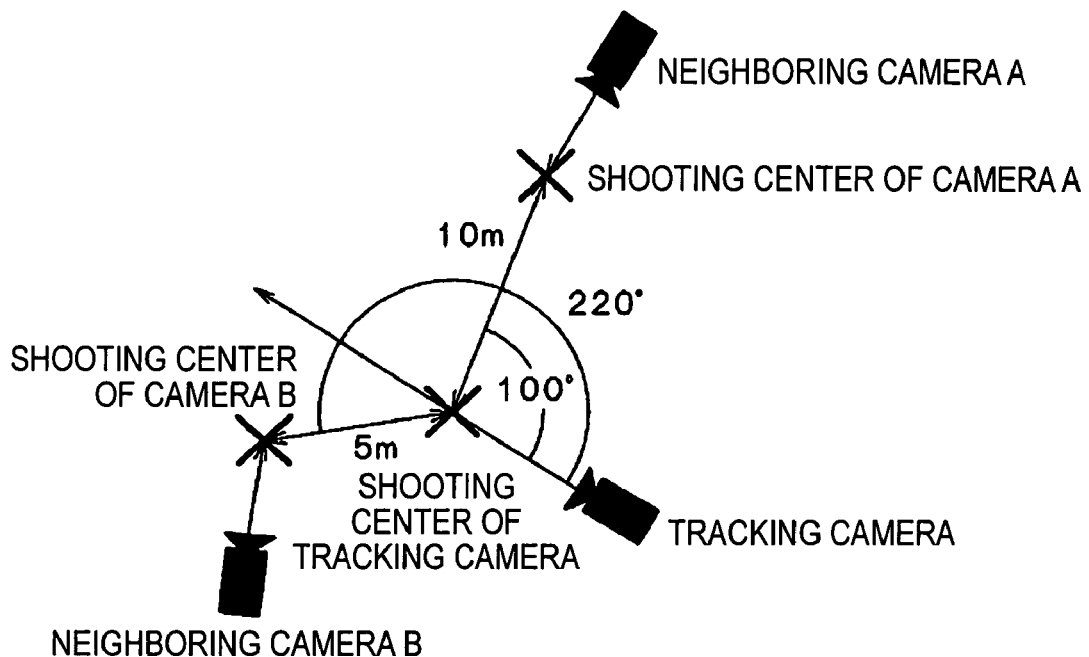
FIGS. 26A and 26B show an example of screen arrangement where the screen size is changed in accordance with the distance between camera shooting centers in the video surveillance system shown in FIG. 20.
Figure 26B:
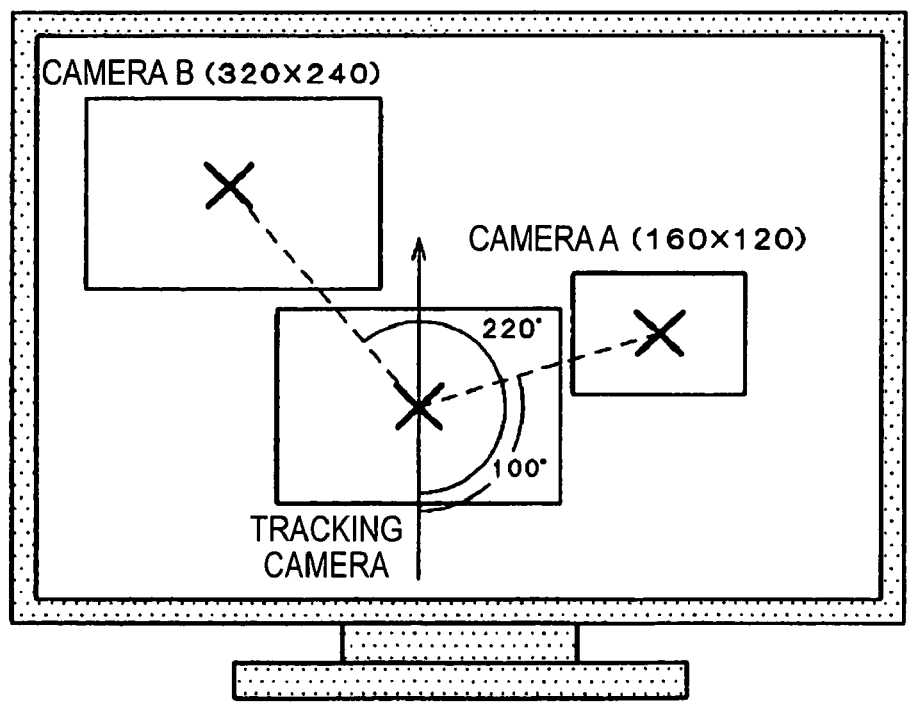

FIGS. 26A and 26B show a screen arrangement example where the screen size of the neighboring camera screen is determined in inverse proportion to the distance between shooting center coordinates. The distance between the shooting center of the tracking camera and that of the neighboring camera A is 10 meters and the distance between the shooting center of the tracking camera and that of the neighboring camera B is 5 meters. The screen of the selected camera A which is in the double distance is displayed one fourth the size of the screen of the selected camera B.

Figure 27A:
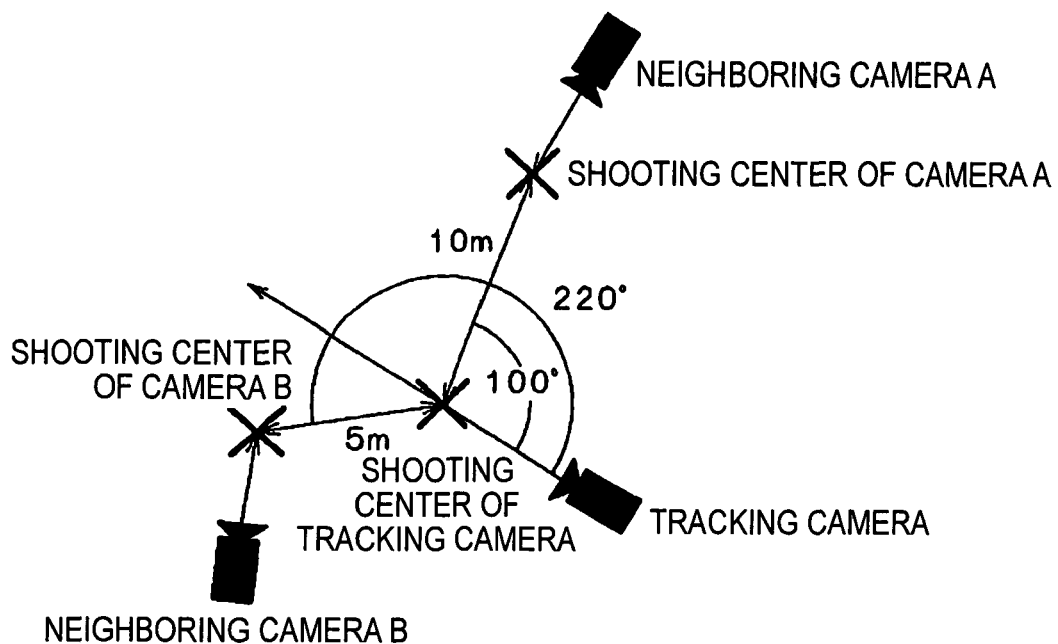
FIGS. 27A and 27B show an example of screen arrangement where the screen center location is changed in accordance with the distance between camera shooting centers in the video surveillance system shown in FIG. 20.
Figure 27B:
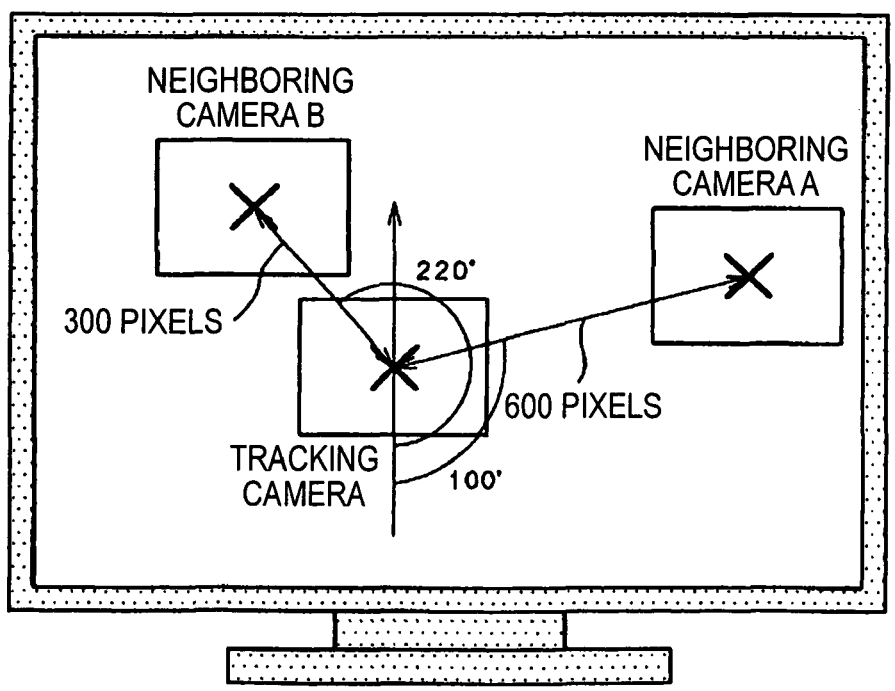

FIGS. 27A and 27B show a screen arrangement example where the screen size of the neighboring camera screen is determined in proportion to the distance between shooting center coordinates. The distance between the shooting center of the tracking camera and that of the neighboring camera A is double that of the distance between the shooting center of the tracking camera and that of the neighboring camera B. The screens are arranged so that the distance between the center of the tracking camera screen and that of the neighboring camera screen A will be 600 pixels which is double the distance between the center of the tracking camera screen and that of the neighboring camera screen B which is 300 pixels.

In this way, by determining the screen size and distance between screens in accordance with the distance between cameras, the invention provides a video surveillance system which allows a surveyor to readily understand the distance between cameras.

Embodiment 3

A video surveillance system according to the third embodiment is described below referring to FIG. 28.

FIG. 28 is a block diagram of a video surveillance system according to the second embodiment of the invention.

In FIG. 28, numerals 103 through 114 are same as the means of the video surveillance system according to the first embodiment shown in FIG. 1.

A numeral 2801 represents a camera server for transmitting a camera picture to a surveillance terminal on a network.

A numeral 2802 represents a video surveillance server for displaying a picture received from the camera server 2801 on the screen.

The network apparatus and means in FIG. 28 are same as those of the first embodiment shown in FIG. 1, except that the video surveillance server 2802 comprises moving direction means 106 and the camera server 2801 and the video surveillance server 2802 each does not comprises moving direction transmitting means 107 or moving direction receiving means 109.

In the video surveillance system according to the third embodiment, the video surveillance server 2802 comprises as many units of camera picture reception means 108 as the number of cameras located in the surveillance zone. Each unit of camera picture reception means 108 constantly receives a picture from the predetermined camera server 2801, calculates the moving direction of the tracking target from the received picture data by way of the operation flow shown in FIG. 2, and outputs the moving direction data to the camera selection means 112, thereby displaying a picture from a camera which shooting the tracking target and a picture from a neighboring camera which will shoot the tracking target next. This provides a surveillance system which assures that the surveyor will never lose track of the tracking target even in case the camera shooting the tracking target has changed.

According to the invention, in the first place, a camera picture which shoots the tracking target and a camera picture which will shoot the tracking target next are simultaneously displayed on the surveillance terminal screen in an environment where a plurality of surveillance cameras are located. It is thus possible to provide a video surveillance system which readily captures the tracking target in the next camera picture even when the tracking target has moved outside the field of view of the camera shooting the tracking target and which assures that the surveyor will never lose track of the tracking target even in case the camera shooting the tracking target has changed.

In the second place, it is possible to provide a video surveillance system which appropriately guides the line of sight of the surveyor when the camera shooting the tracking target has changed without the surveyor losing sight of the location of the tracking target by arranging the screen displaying a picture from a camera which will shoot the tracking target next in a direction where the surveyor can track the moving tracking target in case a plurality of camera pictures are simultaneously displayed on the terminal screen.

In the third place, it is possible to provide a video surveillance system which allows the surveyor to readily understand the locations of the cameras displayed by determining the screen size of the screen of a picture from the camera which will shoot the tracking target next in accordance with the distance between the camera shooting the tracking target and the camera which will shoot the camera next in case a plurality of camera pictures are simultaneously displayed on the terminal screen.

In the fourth place, it is possible to provide a video surveillance system which allows the surveyor to readily understand the locations of the cameras displayed by determining the distance of the screen of a picture from the camera which will shoot the tracking target next in accordance with the distance between the camera shooting the tracking target and the camera which will shoot the camera next in case a plurality of camera pictures are simultaneously displayed on the terminal screen.

What is claimed is:

1. A video surveillance system which monitors a moving object as a tracking target by way of a plurality of cameras in a surveillance zone, said system comprising:
    a camera section that includes a first camera and a plurality of second cameras;
    a detecting section that detects a moving direction of the tracking target based on a first image having the tracking target, the first image shot with the first camera;
    a storage section that stores map information in the surveillance zone and camera information including location information of the camera section and shooting range information of the camera section;
    a selection section that selects from the second cameras a camera located in the moving direction of the tracking target with respect to the first camera based on moving direction information of the tracking target, the map information and the camera information;
    a composition section that combines the first image and a second image shot with the selected camera to generate a display image in which the first image and the second image are arranged at positions corresponding to a positioning relation between the first camera and the selected camera in the map information based on the map information and the camera information; and
    a display section that displays the display image.

2. A surveillance picture generation method for a video surveillance system which monitors a moving object as a tracking target by way of a first camera and a plurality of second cameras in a surveillance zone, said method comprising;
    detecting a moving direction of the tracking target based on a first image having the tracking target, the first image shot with the first camera;
    storing map information in the surveillance zone and camera information including location information and shooting range information of the first camera and the second cameras and;
    selecting from the second cameras a camera located in the moving direction of the tracking target with respect to the first camera based on the moving direction information of the tracking target, the map information and the camera information;
    combining the first image and a second image shot with the selected camera to generate a display image in which the first image and the second image are arranged at positions corresponding to a positioning relation between the first camera and the selected camera in the map information based on the map information and the camera information; and
    displaying the display image.

3. The surveillance picture generation method according to claim 2,
    wherein in the combining process, the second image is arranged in a size of the ratio to a size of the first image, corresponding to a distance between a shooting center of the first camera and a shooting center of the selected camera.

4. The surveillance picture generation method according to claim 2,
    wherein in the combining process, the second image is arranged at a position with respect to the first image, corresponding to a distance between a shooting center of the first camera and a shooting center of the selected camera.

5. The surveillance picture generation method according to claim 2, further comprising;
    storing a third image shot with a third camera which was shooting the tracking target,
    wherein the display image displaying the first image, the second image and the third image is generated.

6. The surveillance picture generation method according to claim 2,
    wherein images related to the first image shot with the first camera are arranged in chronological order in shooting the tracking target.

7. A surveillance video composition apparatus in a video surveillance system which monitors a moving object as a tracking target by way of a first camera and a plurality of second cameras in a surveillance zone, said surveillance video composition apparatus comprising;
    a detecting section that detects a moving direction of the tracking target based on a first image having the tracking target, the first image shot with the first camera;
    a storage section that stores map information in the surveillance zone and camera information including location information and shooting range information of the first camera and the second cameras and;
    a selection section that selects from the second cameras a camera located in the moving direction of the tracking target with respect to the first camera based on the moving direction information of the tracking target, the map information and the camera information;
    a composition section that combines the first image and a second image shot with the selected camera to generate a display image in which the first image and the second image are arranged at positions corresponding to a positioning relation between the first camera and the selected camera in the map information based on the map information and the camera information; and
    a display section that displays the display image.

8. The surveillance video composition apparatus according to claim 7,
    wherein the composition section generates the display image in which the second image is arranged in a size of the ratio to a size of the first image, corresponding to a distance between a shooting center of the first camera and a shooting center of the selected camera.

9. The surveillance video composition apparatus according to claim 7,
    wherein the composition section generates the display image in which the second image is arranged at a position with respect to the first image, corresponding to a distance between a shooting center of the first camera and a shooting center of the selected camera.

* * * * *